(12) United States Patent
Yumiki et al.

(10) Patent No.: US 6,456,444 B1
(45) Date of Patent: Sep. 24, 2002

(54) LENS BARREL

(75) Inventors: Naoto Yumiki, Osaka (JP); Takayuki Hayashi, Kyoto (JP); Yutaka Takahashi, Osaka (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 09/647,123

(22) PCT Filed: Jan. 26, 2000

(86) PCT No.: PCT/JP00/00392
§ 371 (c)(1),
(2), (4) Date: Apr. 16, 2001

(87) PCT Pub. No.: WO00/45209
PCT Pub. Date: Aug. 3, 2000

(30) Foreign Application Priority Data

Jan. 26, 1999 (JP) ............................................. 11-016774
Feb. 5, 1999 (JP) ............................................. 11-028248

(51) Int. Cl.⁷ .............................. G02B 15/14; G02B 7/02
(52) U.S. Cl. ........................ 359/696; 359/694; 359/823
(58) Field of Search ................................. 359/694, 695, 359/696, 813, 814, 823, 824

(56) References Cited

U.S. PATENT DOCUMENTS 5,939,804 A 8/1999 Nakao et al. ................... 310/12
6,091,548 A * 7/2000 Chen ............................. 359/637

FOREIGN PATENT DOCUMENTS

| JP | 10-225083 | 8/1998 | |
| JP | 10-254019 | 9/1998 | |
| JP | 11-2506 | 1/1999 | |
| JP | 2000-0214508 A | * 8/2000 | ............ G02B/5/00 |

* cited by examiner

*Primary Examiner*—Ricky Mack
(74) *Attorney, Agent, or Firm*—Michael K Kelly; Snell & Wilmer LLP

(57) ABSTRACT

A lens barrel according to the present invention includes a first lens group; a second lens group; a third lens group; a first actuator for driving the first lens group; a second actuator for driving the second lens group; and third and fourth actuators for driving the third lens group. At least one of the first through fourth actuators is provided at a position such that magnetic flux leakage from at least one of the first through fourth actuators is canceled.

18 Claims, 25 Drawing Sheets (a)

(b)

(a)

(b)

(a)

(b)

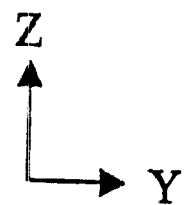
FIG.19
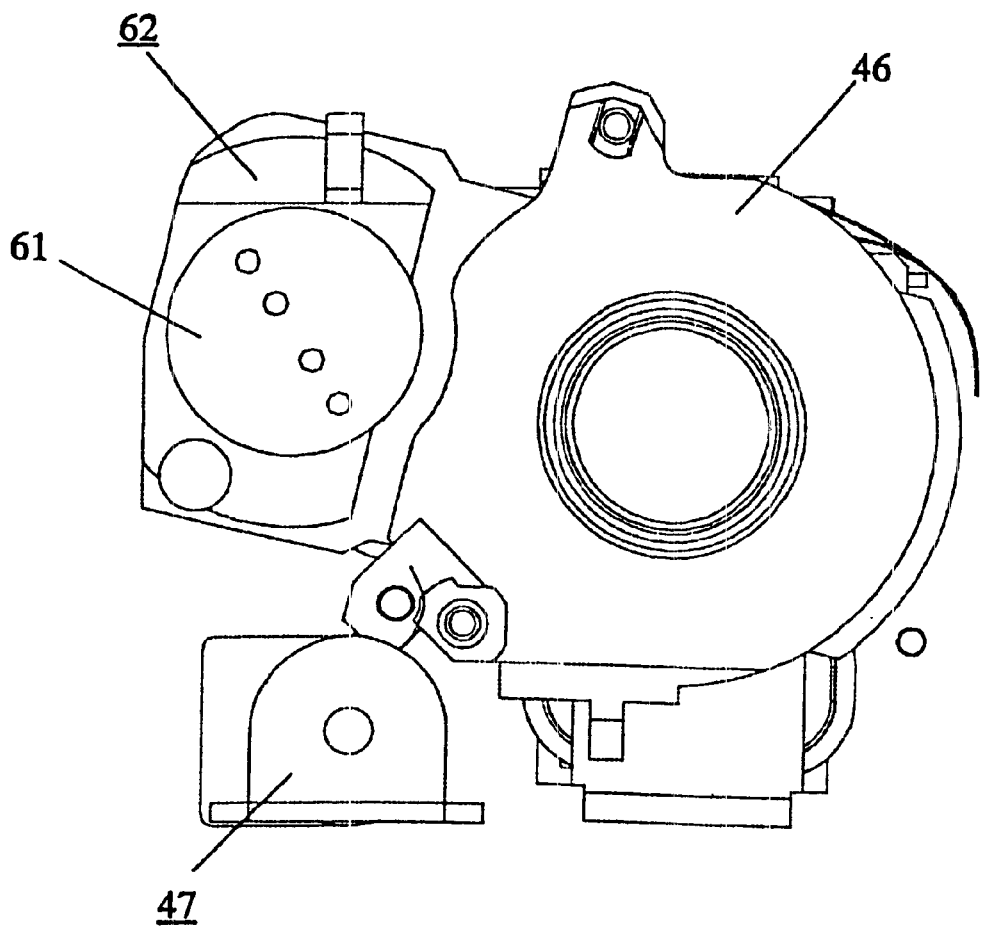

ly. Japanese Laid-Open Publication No. 8-266093 proposes a
LENS BARREL

TECHNICAL FIELD

The present invention relates to a lens barrel for use in a video camera or the like.

BACKGROUND ART

Recently there is a demand for small-sized lens barrels for video cameras whose body-size is being reduced. Faster zooming or focusing is also required.

Hereinafter, a conventional lens barrel will be described.

In general, a lens barrel for a video camera includes four lens groups. Movable lens groups of the four lens groups are moved in a direction of an optical axis by guiding along a guide pole for the purposes of zooming and focusing. The lens barrel includes a fixed lens group, a lens group movable on the optical axis for zooming, another fixed lens group, a lens group movable on the optical axis for focusing, an iris unit, and an imaging plane. The zooming lens group and the focusing lens group are held by a zooming lens frame and a focusing lens frame, respectively. A zooming actuator and a focusing actuator for driving the zooming lens moving frame and the focusing lens frame in the optical axis direction, respectively, each include a stepping motor. The zooming and focusing stepping motors each include a screw on the respective output axes. The zooming lens moving frame and the focusing lens frame are linked to each other by a linkage. Two guide poles are used to hold the zooming lens moving frame and the focusing lens frame so that the frames can freely move in the optical axis direction. In such a lens barrel, when a current is supplied to the zooming stepping motor via an electrical signal line, the output axis is rotated so that the linkage which is engaged with the screw of the zooming stepping motor is moved in the optical axis direction. The zooming lens moving frame, i. e., the zooming lens group, which is engaged with the linkage, is then moved in the optical axis direction. Similarly, when a current is supplied to the focusing stepping motor via the electrical signal line, the output axis is rotated so that the linkage which is engaged with the screw of the focusing stepping motor is moved in the optical axis direction. The focusing lens frame, i.e., the focusing lens group, which is engaged with the linkage, is then moved in the optical axis direction.

Such a conventional structure has the following problems.

(1) The stepping motor used as the actuator in the conventional lens barrel can be stopped at a predetermined position by rotating the motor by an angle corresponding to a predetermined number of pulses. However, since the driving control of the stepping motor is an open loop, there are the following problems: the precision in the stopping positions is poor; a hysteresis property exists; the number of revolutions is relatively low, and the like. Therefore, when the stepping motor is used as a driving power source of a transporting mechanism for the zooming or focusing lens moving frame, the zooming or focusing speed is slow. Japanese Laid-Open Publication No. 8-266093 proposes a stepping motor system having an encoder as a solution to this above problem. As is disclosed by the publication, a sensor is provided which detects the rotational angle of a stepping motor. The sensor results in the control system being a closed loop, thereby making it possible to achieve high-speed driving. Japanese Laid-Open Publication No. 10-225083 proposes a linear actuator system which can track the changing positions of the focusing group using a voice type linear actuator. Such a linear actuator system has a high-speed response capability and lower power consumption.

Therefore, the lens driving system may be optimized by adopting a stepping motor having an encoder for driving the zooming lens group; and by adopting a linear actuator for moving the focusing lens group, for the purpose of the high-speed response capability and low power consumption. Such a system generally includes a magnetoresistance sensor (hereinafter referred to as a magnetic sensor) as a position detection sensor in order to increase the precision of the position detection.

A small-sized and lightweight lens barrel is required for recent small-sized and lightweight video cameras. Therefore, intervals of components included in the lens barrel tend to be decreased. When a conventional magnetic sensor is affected by an external disturbance magnetic field, the output of the sensor is distorted, causing a problem in that the performance of the actuator is deteriorated. Magnetic flux leakage from a driving magnet occurs in the above-described stepping motor having an encoder and linear actuator. Such magnetic flux leakage is not negligible in the case of a small-sized lens barrel since the gaps between the parts thereof are narrow. In particular, the driving magnet of the linear actuator has an adverse influence on the magnetic sensor of the stepping motor having an encoder. Conventionally, an additional part such as a magnetic shield has been used to address the magnetic flux leakage problem. However, such a magnetic shield leads to an increase in cost. The provision of a space for the magnetic shield hinders achievement of the small-sized lens barrel. Therefore, a system including the small-sized and lightweight lens barrel, the stepping motor having an encoder, and the linear actuator cannot realize the high-speed response capability and low power consumption in driving the zooming and focusing lenses.

(2) A small-size, lightweight and high-magnification lens barrel poses a problem that hand-shake makes it difficult to obtain a stable image at the furthermost focusing point. A conventional solution to the problem is an electric hand-shake compensation system. The compensation extent needs to be expanded with an increase in the degree of hand-shake in the smaller-sized, lighter-weight, and higher magnification lens barrel. The compensation extent to the hand-shake in the electrical compensation system depends on the number of pixels in the CCD, requiring many pixels. Smaller-sized CCDs and higher picture quality video cameras pose limitations to the increased number of pixels allowed in the CCD, whereby the electric hand-shake compensation system does not work effectively.

Optical hand-shake compensation systems have been proposed whose compensation extents are large and in which high picture quality is obtained. As one of the optical hand-shake compensation systems, Japanese Laid-Open Publication No. 3-186823 discloses a so-called inner-shift system in which the hand-shake is compensated by moving a predetermined lens group (shift lens group) in a direction perpendicular to the optical axis. In the inner shift system, a lens group required for focusing is also used as the shift lens group for compensating the hand-shake. Therefore, a short, small-sized, and lightweight lens barrel can be realized.

However, two additional actuators are required for moving the compensation lens group in a direction perpendicular to the optical axis. In addition to the actuators for zooming, focusing, and the iris included in the conventional lens barrel, two shift actuators are required for compensating the hand-shake. That is, five actuators need to be provided in a single lens barrel. This increased number of actuators makes it difficult to obtain a small-sized lens barrel, which runs against the recent tide of small-sized lens barrels. In this case, it is important to arrange these actuators in a compact manner.

(3) As indicated in problem (1), when the stepping motor having an encoder using the magnetic sensor, and the linear actuator are used as the zooming and focusing actuators, respectively, magnetic flux leakage from the two shift actuators for image shake compensation occurs, adversely affecting the magnetic sensor.

Therefore, an object of the present invention is to provide a lens barrel which can eliminate the adverse effect of the magnetic flux leakage occurring in the actuator on the magnetic sensor.

DISCLOSURE OF THE INVENTION

A lens barrel according to the present invention includes a first lens group; a second lens group; a third lens group; a first actuator for driving the first lens group; a second actuator for driving the second lens group; and third and fourth actuators for driving the third lens group. At least one of the first through fourth actuators is provided at a position such that magnetic flux leakage from at least one of the first through fourth actuators is canceled. Thereby, the above object is achieved.

The first actuator may include a stepping motor; a first magnet in the shape of a barrel or column, magnetized to have multiple poles in a circular direction, and attached coaxially to the stepping motor in such a manner as to rotate; and a first magnetic sensor provided opposing an outer edge of the first magnet. The second actuator includes a second magnet magnetized perpendicular to a driving direction; a yoke; a coil provided at a predetermined gap from the second magnet, capable of freely moving in the driving direction when a current is supplied thereto in such a manner as to flow in a direction perpendicular to magnetic flux generated by the second magnet; and a second magnetic sensor. The first magnetic sensor may be provided at a position such that magnetic flux leakage from a magnetic circuit including the second magnet and the yoke is canceled.

The second actuator may include a magnet magnetized perpendicular to a driving direction; a yoke; a coil provided at a predetermined gap from the magnet, capable of freely moving in the driving direction when a current is supplied thereto in such a manner as to flow in a direction perpendicular to flux generated by the magnet; and a magnetic sensor. The magnetic sensor may be provided at a position such that magnetic flux leakage from at least one of the third and fourth acturator is canceled.

The third actuator may include a third magnet, the fourth actuator includes a fourth magnet; and the third magnet and the fourth magnet are provided in such a manner that the magnetization of the third and fourth magnets is reversed when viewed in the center of an optical axis.

The first actuator may include a stepping motor; a first magnet in the shape of a barrel or column, magnetized to have multiple poles in a circular direction, and attached coaxially to the stepping motor in such a manner as to rotate; and a magnetic sensor provided opposing an outer edge of the first magnet. The third and fourth magnets may be provided at positions such that magnetic flux leakage to the magnetic sensor is canceled.

The lens barrel may further include first and second lens moving frames holding the third lens group and capable of being smoothly moved in first and second directions perpendicular to an optical axis, respectively. One of the third or fourth actuators provided at an optical axis imaging plane side may be provided overlapping the lens moving frame provided at an optical axis object side when viewed in the optical axis direction.

The second actuator may be provided at an optical axis imaging plane side of one of the third and fourth actuators provided at an optical axis object side, overlapping one of the third and fourth actuators, when viewed in the optical axis direction.

The lens barrel may further include first and second lens moving frames holding the third lens group and capable of being smoothly moved in first and second directions perpendicular to the optical axis, respectively; and a fixing frame holding the first and second lens moving frames, leaving the first and second lens moving frames capable of being smoothly moved. The fixing frame may include a depression in a portion surrounded by the third and fourth actuators; and the first actuator is provided in the depression.

The lens barrel may further include an actuator for driving an iris. The actuator for driving the iris may be provided at the optical axis object side of one of the third and fourth actuators provided at an optical axis imaging plane side.

The lens barrel may further include first and second lens moving frames holding the third lens group, provided at different heights with respect to an optical axis, and capable of being smoothly moved in first and second directions perpendicular to the optical axis; a first light emitting portion incorporated into the first lens moving frame for detecting a position of the first lens moving frame; and a second light emitting portion incorporated into the second lens moving frame for detecting a position of the second lens moving frame. The first and second light emitting portions may be provided at substantially the same height when viewed in the optical axis direction.

The lens barrel may further include first and second lens moving frames holding the third lens group, and capable of being smoothly moved in first and second directions perpendicular to an optical axis; and a fixing frame fixing the first and second lens moving frames, leaving the first and second lens moving frames capable of being smoothly moved. The third actuator may drive the first lens moving frame. The fourth actuator may drive the second lens moving frame. The lens barrel may further include a first flexible print cable electrically connected to the third actuator; and a second flexible print cable electrically connected to the fourth actuator. One end of the first flexible print cable may be fixed to the first lens moving frame at a side thereof opposite to the third actuator with respect to the optical axis and at the same side as that of the fourth actuator. One end of the second flexible print cable may be fixed to the second lens moving frame at a side thereof opposite to the third and fourth actuators with respect to the optical axis. Other ends of the first and second flexible print cables may be fixed to the fixing frame at a side thereof opposite to the fourth actuator with respect to the optical axis, being substantially parallel to a direction along which the first lens moving frame is smoothly moved.

The first flexible print cable may be provided at an outside from the center of the optical axis with respect to the second flexible print cable.

The first and second flexible print cables may be provided at different heights with respect to the optical axis of the third lens group.

Moving portions of the first and second flexible print cables and an outline of the fixing frame corresponding to the moving portions of the first and second flexible print cables may be substantially in the shape of a circular arc. The moving portions of the first and second flexible print cables may move along the fixing frame.

Another lens barrel according to the present invention includes a first lens group; a second lens group; a third lens group; a first actuator for driving the first lens group; a second actuator for driving the second lens group; third and fourth actuators for driving the third lens group; first and second lens moving frames holding the third lens group and capable of being smoothly moved in first and second directions perpendicular to an optical axis; and a fixing frame fixing the first and second lens moving frames, leaving the first and second lens moving frames capable of being smoothly moved. The third actuator drives the first lens moving frame. The fourth actuator drives the second lens moving frame. The lens barrel further includes: a first flexible print cable electrically connected to the third actuator. A second flexible print cable electrically connected to the fourth actuator. One end of the first flexible print cable is fixed to the first lens moving frame at a side thereof opposite to the third actuator with respect to the optical axis and at the same side as that of the fourth actuator. One end of the second flexible print cable is fixed to the second lens moving frame at a side thereof opposite to the third and fourth actuators with respect to the optical axis. Other ends of the first and second flexible print cables are fixed to the fixing frame at a side thereof opposite to the fourth actuator with respect to the optical axis, being substantially parallel to a direction along which the first lens moving frame is smoothly moved. Thereby, the above-described object is achieved.

The first flexible print cable may be provided at an outside from the center of the optical axis with respect to the second flexible print cable.

The first and second flexible print cables may be provided at different heights with respect to the optical axis of the third lens group.

Moving portions of the first and second flexible print cables and an outline of the fixing frame corresponding to the moving portions of the first and second flexible print cables may be substantially in the shape of a circular arc. The moving portions of the first and second flexible print cables may move along the fixing frame.

BRIEF DESCRIPTION OF THE DRAWINGS

FIG. 19 is a front view of the lens barrel according to Example 6 of the present invention.

BEST MODE FOR CARRYING OUT THE INVENTION

Example 1

Figure 1:
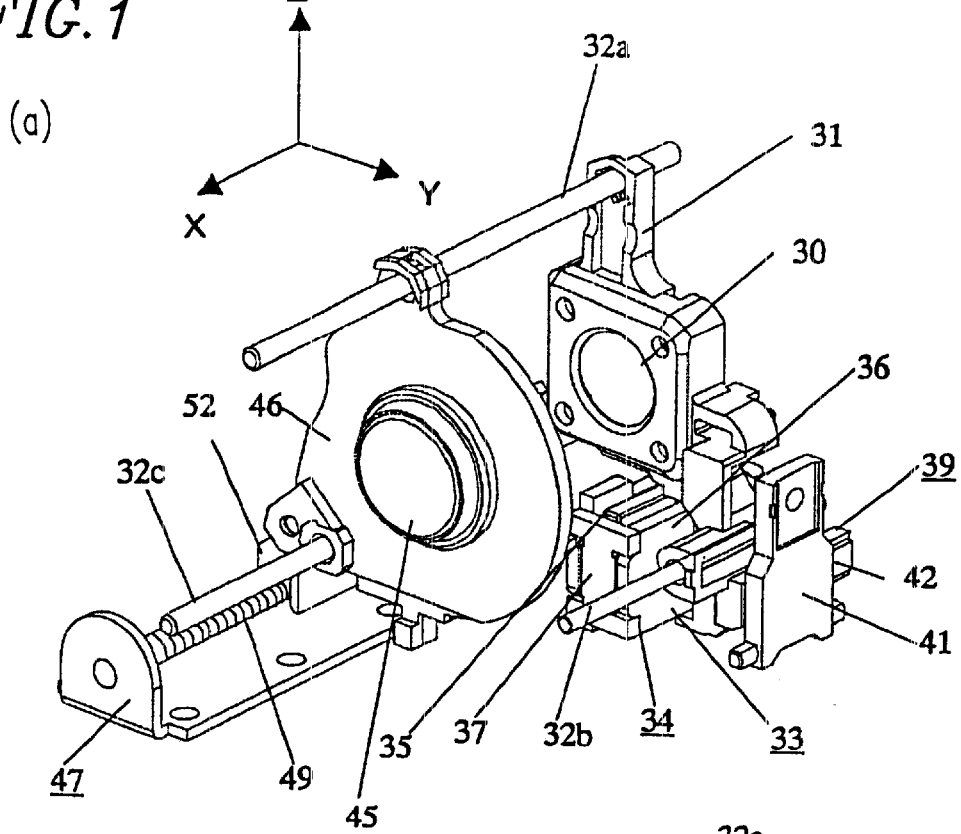
FIGS. 1(a) and 1(b) are a rough perspective view of a lens barrel including a linear actuator and a stepping motor having an encoder according to Example 1 of the present invention, with FIG. 1(a) being the front view and FIG. 1(b) being the reverse view.
Figure 1:
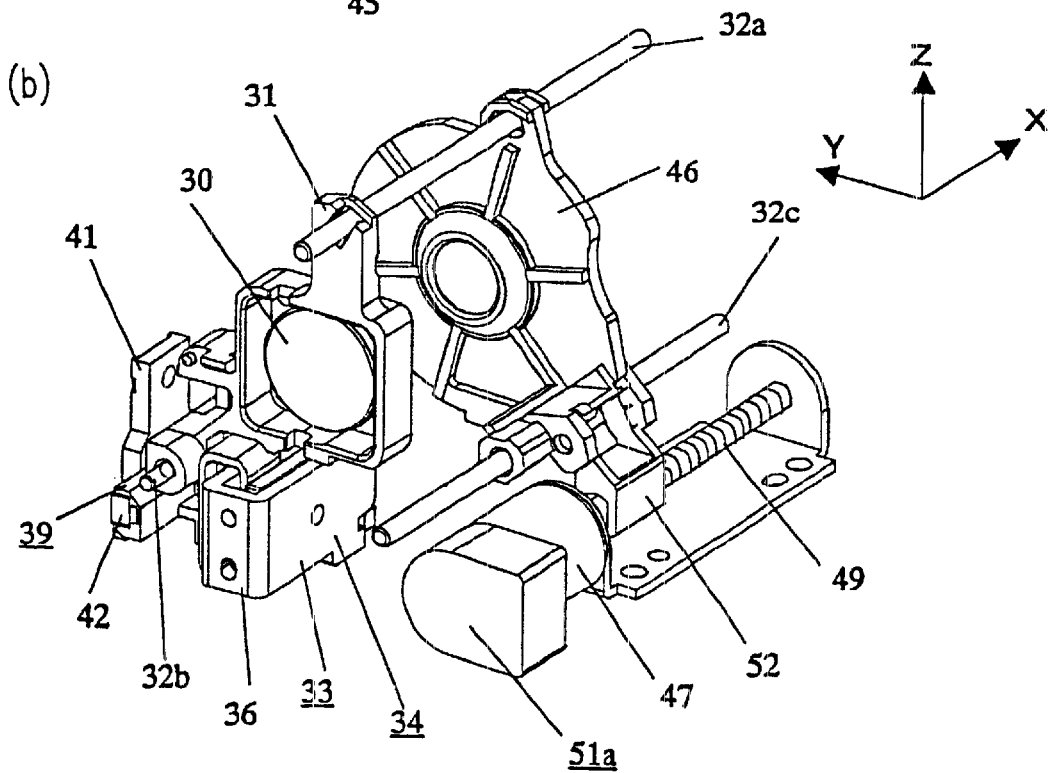
Figure 2:
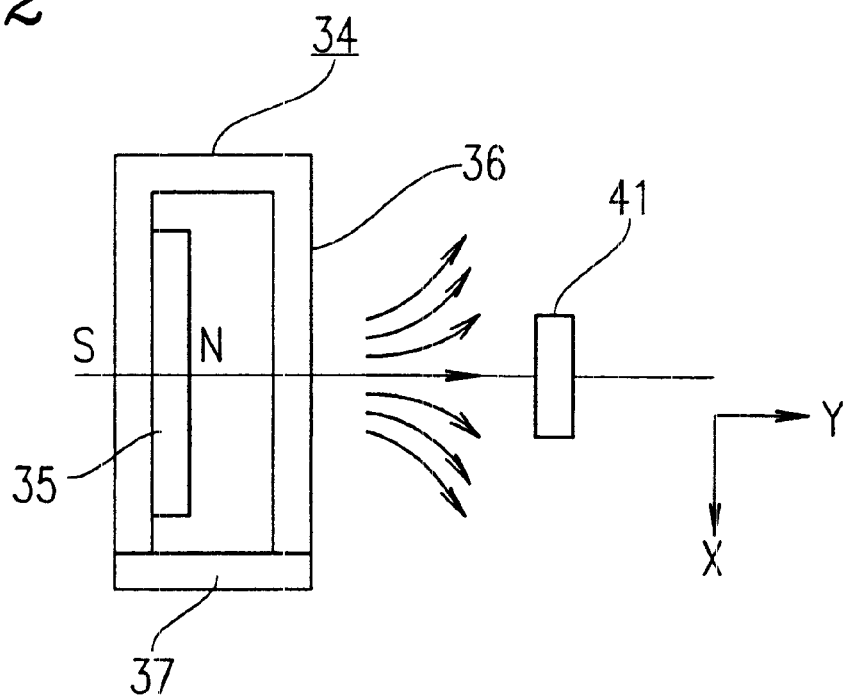
FIGS. 2(a) and 2(b) are a conceptual diagram showing a flow of magnetic flux leakage from the linear actuator according to Example 1 of the present invention, with FIG. 2(a) being a side view and FIG. 2(b) being a top view.
Figure 2:
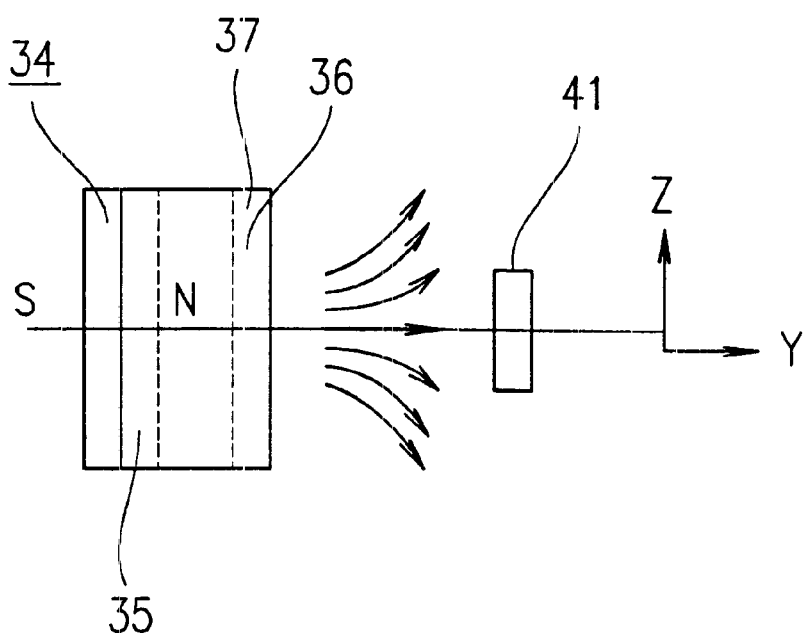
Figure 3:
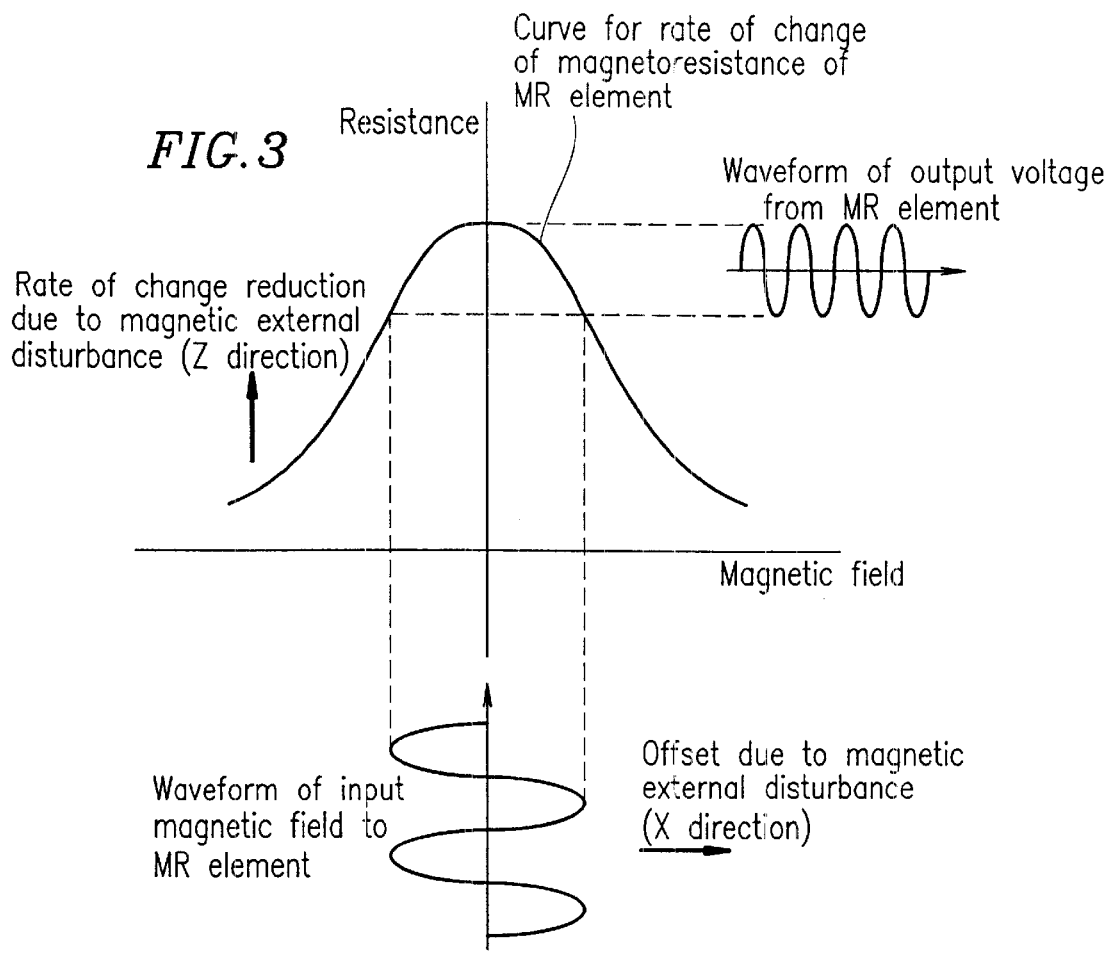
FIG. 3 is a diagram showing the magnetoresistance change characteristics of an MR element.
Figure 4:
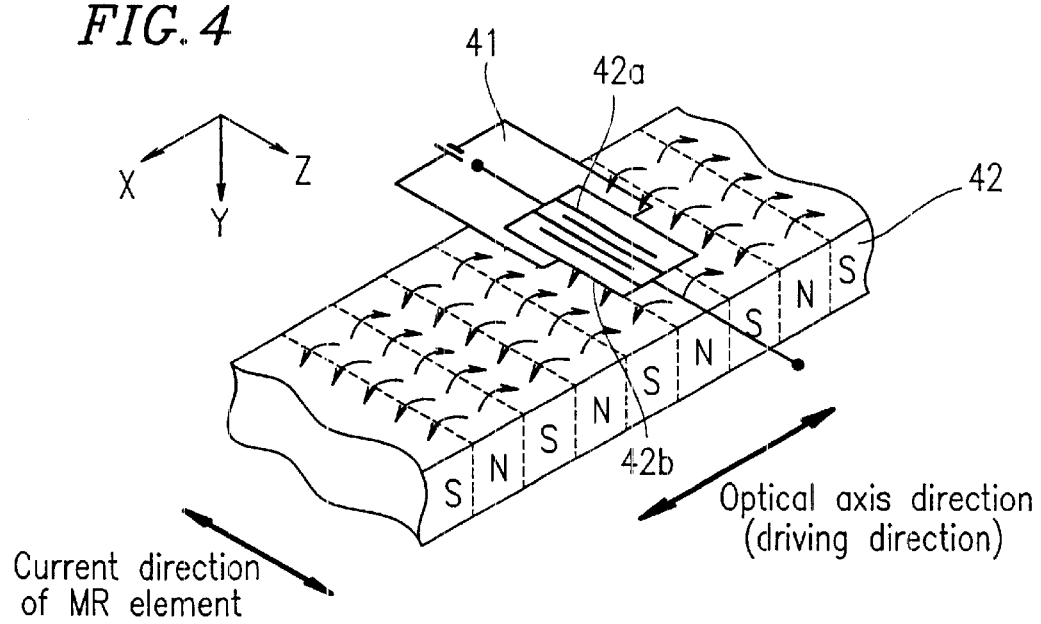
FIG. 4 is a rough perspective view of a position detection portion including an MR element.
Figure 5:
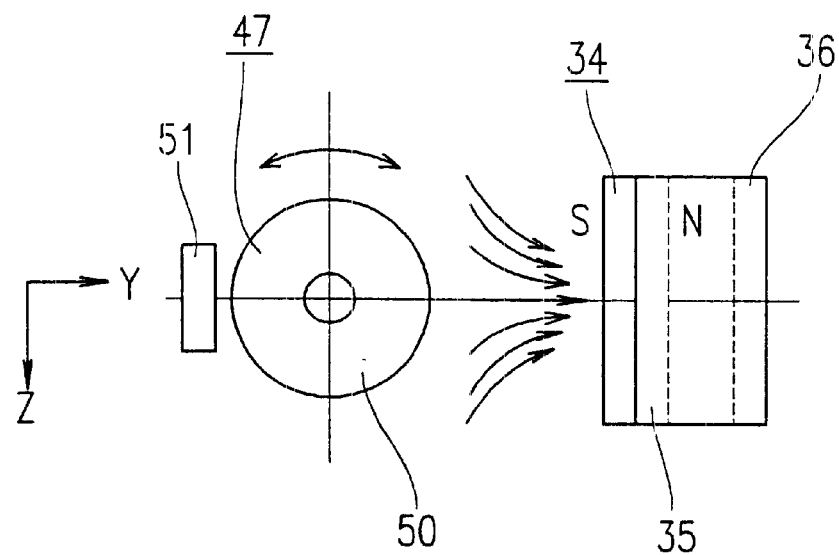
FIGS. 5(a) and 5(b) are a conceptual diagram showing a flow of magnetic flux leakage to the stepping motor having an encoder according to Example 1 of the present invention, with FIG. 5(a) being a top view and FIG. 5(b) being a side view.
Figure 5:
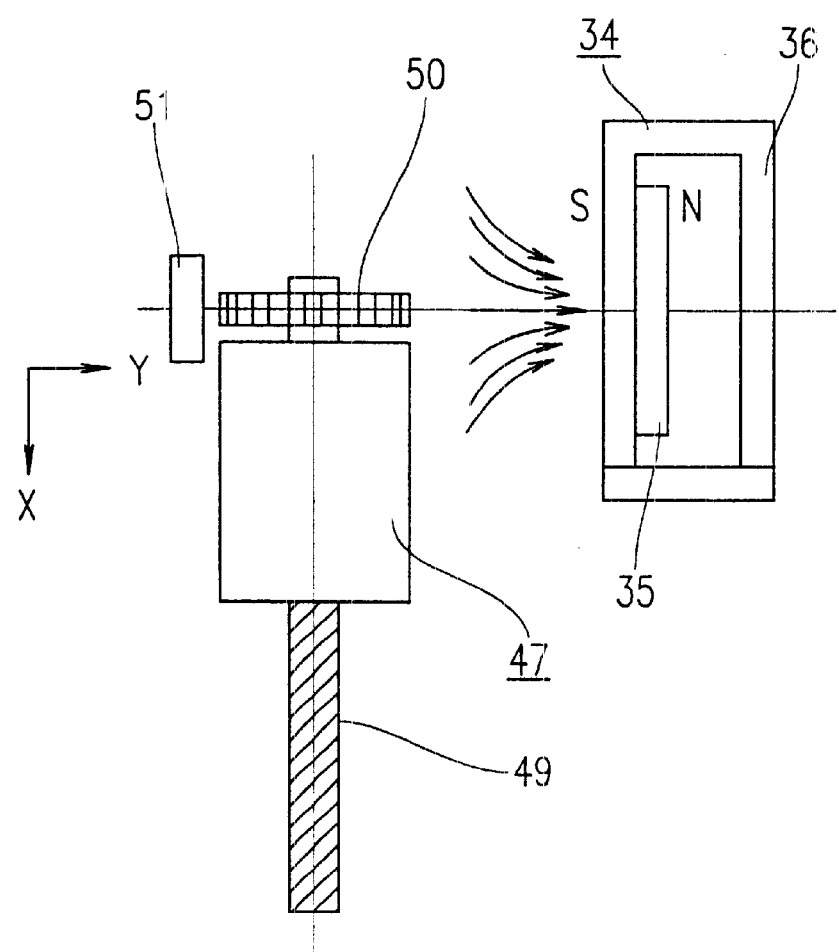
Figure 6:
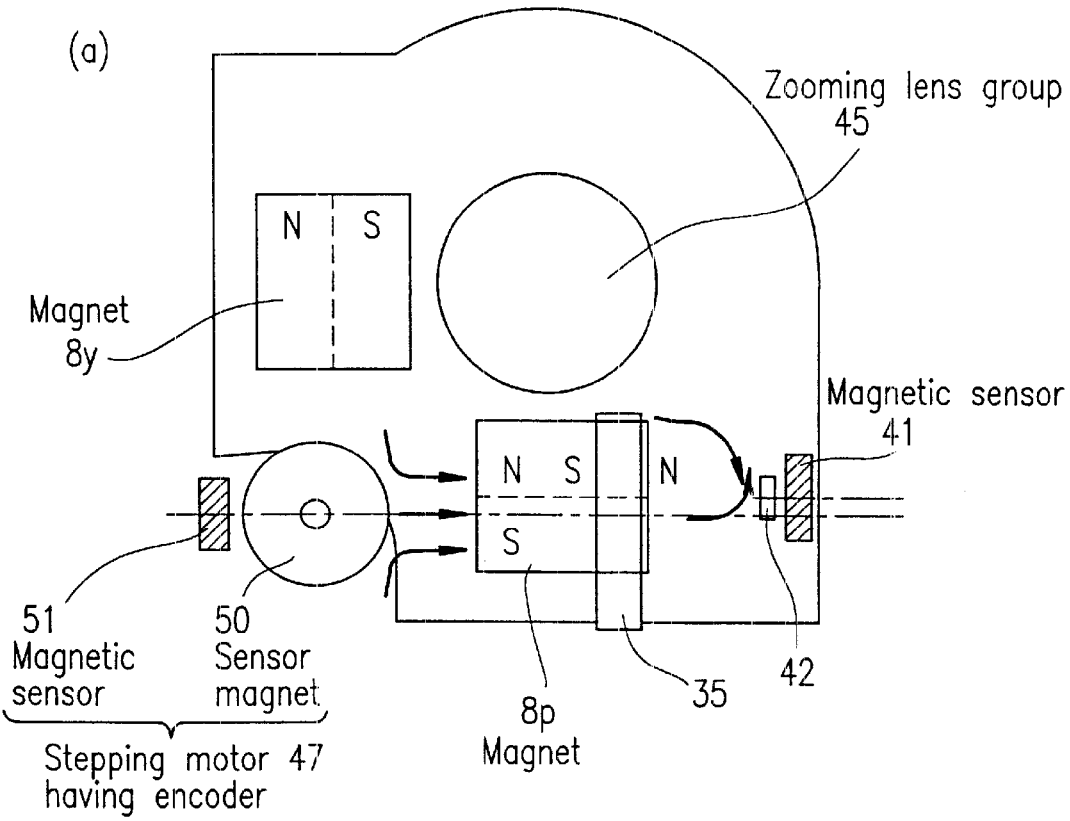
FIGS. 6(a) and 6(b) are a conceptual diagram showing a flow of magnetic flux leakage to a magnetic sensor according to Example 1 of the present invention, with FIG. 6(a) being a top view and 6(b) being a side view.
Figure 6:
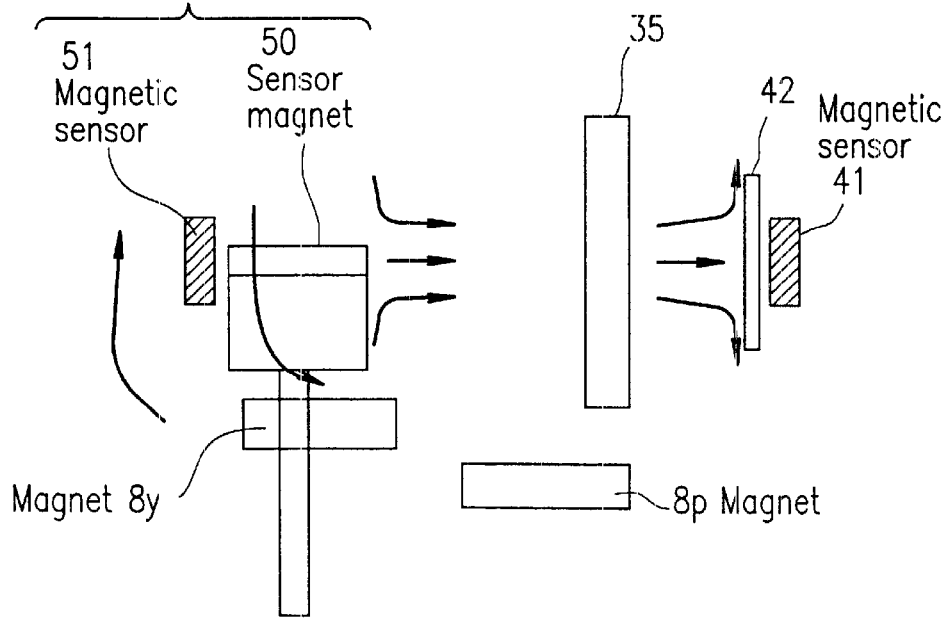

Hereinafter, a lens barrel according to Example 1 of the present invention will be described with reference to FIGS. 1 through 6. FIG. 1 is a rough perspective view of the lens barrel including a linear actuator and a stepping motor having an encoder according to Example 1 of the present invention. FIG. 2 is a conceptual diagram showing a flow of magnetic flux leakage from the linear actuator. FIG. 3 is a diagram showing the magnetoresistance change characteristics of an MR element. FIG. 4 is a rough perspective view of a position detection portion including the MR element. FIG. 5 is a conceptual diagram showing a flow of magnetic flux leakage to the stepping motor having an encoder. FIG. 6 is a conceptual diagram showing a flow of magnetic flux leakage to a magnetic sensor according to Example 1 of the present invention.

A focusing lens moving frame 31 holds a focusing lens group 30, being directed in parallel to an optical axis thereof. The focusing lens moving frame 31 is smoothly moved along guide poles 32a and 32b, whose ends (not shown) are fixed to the lens barrel, in an optical axis direction (X-direction). A fixing member 34 of a linear actuator 33 is provided in the lens barrel for driving the focusing lens moving frame 31 in the optical axis direction. The fixing member 34 includes a main magnet 35 having a magnetization direction perpendicular to the driving direction (X-direction), a U-shaped main yoke 36, and a plate-shaped side yoke 37.

A magnetic circuit 38 including the fixing member 34 is laterally symmetrical when viewed in the driving direction and is substantially laterally symmetrical when viewed in the driving direction (X direction). A moving member 39 of the actuator 33 includes a coil 40 which is fixed to the focusing lens moving frame 31 in such a manner to create a predetermined gap between the coil 40 and the magnet 35. A current is supplied to the coil 40, flowing in a direction perpendicular to that of the magnetic flux generated by the magnet 35. Thereby, the focusing lens moving frame 31 is driven in the optical axis direction.

In order to control the position of the focusing lens moving frame 31, a magnetic sensor 41 is provided as a position detection device in the lens barrel on the fixed side at the center position around which the magnetic circuit 38 is symmetrical when viewed in the driving direction (X direction) and at the center position around which the magnetic circuit 38 is symmetrical when viewed in the driving direction. A magnetic scale 42 including alternating N poles and S poles is attached to the focusing lens moving frame 31 at a predetermined distance away from the detection surface of the magnetic sensor 41 opposed thereto. The magnetic sensor 41 is a two-phase magnetoresistance sensor including MR elements 43a and 43b made of a ferromagnetic thin film. The MR elements 43a and 43b are provided in the driving direction at intervals of a ¼ of the pitch between the N pole and the S pole. The magnetic sensor 41 and the magnetic scale 42 are provided so that the direction of a current flowing through the MR elements 43a and 43b is perpendicular to the magnetization direction of the magnet 35.

Next, a position detection method using the magnetic sensor 41 will be described. As to the directional property of the magnetoresistance change shown in FIG. 3, the resistance is substantially independent of a magnetic field in a direction (Y direction) perpendicular to the current direction of the MR elements 43a and 43b and perpendicular to the detection surface; the resistance greatly changes depending on a magnetic field in a direction (X direction) perpendicular to the current direction of the MR elements 43a and 43b and parallel to the detection surface; and the resistance slightly changes depending on a magnetic field in a direction (Z direction) parallel to the current direction of the MR elements 43a and 43b.

Due to such characteristics, when the position of the magnetic scale 42 having a magnetization pattern as shown in FIG. 4 is changed with respect to the magnetic sensor 41, the resistances of the MR elements 43a and 43b change in accordance with a sine-wave pattern of magnetic field variation occurring along the X direction. Although a sine-wave pattern of magnetic field variation whose phase is different from that in the X direction by 180° also occurs in the Y direction, the resistances of the MR elements 43a and 43b do not substantially change due to the abovedescribed characteristics. Therefore, when a voltage applied to the MR elements 43a and 43b is used as an output signal, the output signal has the two sine waves whose phases are different from each other by 90°. The two signal waves are subjected to a modulation interpolation processing by a signal processing circuit (not shown), thereby detecting the position and driving direction of the lens moving frame 31. Based on these data, the position of the focusing lens group 30 can be controlled with a high precision by a control circuit (not shown).

However, in order to realize a high-precision linear actuator, an external disturbance magnetic field entering the magnetic sensor 41 needs to be suppressed. When an external disturbance magnetic field is present in the optical axis direction (X direction) in the linear actuator 33, the external disturbance magnetic field is superposed on the sine-wave pattern of magnetic field intensity variation. Therefore, a signal wave is offset, so that the waveform of the output signal is distorted. This leads to an increase in an error in the position detection. Although the sensitivity to the magnetoresistance change is small in a direction (Z direction) orthogonal to the optical axis, the change rate of the magnetoresistance is decreased and therefore the sensitivity of the MR elements is deteriorated.

Therefore, the linear actuator 33 needs to avoid the influence of the external disturbance magnetic field, particularly by the influence of the main magnet 35, with respect to the X and Z directions.

As described above, the magnetic flux leakage is reduced by providing the magnetic sensor 41 at the center of the magnetic circuit 38. As shown in FIG. 2(a), the MR elements 43a and 43b have a property in which the magnetoresistance changes in the X and Z directions. Since the magnetic circuit 38 is substantially symmetrical with respect to the driving direction (X direction), the amount of magnetic flux leakage is very small in the X direction of the magnetic sensor 41 positioned at the center of the symmetry. Also, as shown in FIG. 2(b), sincethemagnetic circuit 38 is substantially symmetrical with respect to the driving direction, the amount of magnetic flux leakage is very small in the Z direction of the magnetic sensor 41 positioned at the center of the symmetry. As described above, the optimization of the position of the magnetic sensor 41 leads to a reduction in magnetic flux leakage.

A stepping motor 47 having an encoder for moving a zooming lens group 45 in the optical axis direction will be described.

The stepping motor 47 having an encoder includes a stepping motor 48, a lead screw 49 which is combined with the rotational axis of the stepping motor, a sensor magnet 50 having alternating N poles and S poles, and a fixed magnetic sensor 51 for detecting angles opposed to the sensor magnet 50. Note that in FIG. 1, the sensor magnet 50 and the magnetic sensor 51 are covered with a cover 51a for fixing the magnetic sensor 51. For the lead screw 49, a zooming lens moving frame 46 holding the zooming lens group 45 is coupled with a screw member 52 which is engaged with the lead screw 49.

Therefore, the zooming lens group 45 is linearly moved in the X-axis direction by rotation of the lead screw 49. A CPU (not shown) of a system for the stepping motor having an encoder evaluates information on the angle of the rotational axis and information on an electrical phase angle based on a counted value from a counter for the electrical phase. The CPU evaluates a drive instruction value based on the angle information and the electrical phase angle information. The stepping motor 47 having an encoder is controlled by flowing a driving current by a driver.

However, when the magnetic sensor 51 of the stepping motor 47 having an encoder is affected by the external disturbance magnetic field, the output of the magnetic sensor 51 is distorted, similar to the magnetic sensor 41 of the linear actuator 33. The performance of the actuator is deteriorated. Note that the limit of the magnitude of the external disturbance magnetic field is about 10 gauss for the magnetic sensor 41 of the liner actuator 33. The magnetic sensor 51 of the stepping motor 47 having an encoder has a smaller limit compared with the limit of the external disturbance magnetic field for the linear actuator 33, in part because the sensor magnet 50 is barrel-shaped and the magnetic sensor surface is flat.

The stepping motor 47 having an encoder has less influence on the external disturbance magnetic field from the magnet 48a of the stepping motor 48. Nevertheless, since the lens barrel is small sized, the distance between the stepping motor 47 and the linear actuator 33 is small. In particular, the stepping motor 47 is likely to be affected by the main magnet 35 of the linear actuator 33. Accordingly, in the stepping motor 47 having an encoder, the magnetic sensor 51 needs to be provided at a position at which the magnetic sensor 51 is unlikely to be affected by the external disturbance magnetic field. This condition will be described.

When the magnetic sensor 51 is provided at a position indicated in FIGS. 5 and 6 in the stepping motor 47 having an encoder, the external disturbance magnetic field needs to be suppressed in two directions, i.e., the tangential direction (Z direction) of the rotational direction of the sensor magnet 50 and in the current direction (X direction) in the magnetic sensor 51. The magnetic sensor 51 of the stepping motor 47 having an encoder is provided based on the following principle. Since the magnetic circuit 38 of the linear actuator 33 is laterally symmetrical when viewed in the driving direction, the magnetic sensor 51 positioned at the center of the symmetry detects substantially no magnetic flux leakage in the Z direction. Similarly, since the magnetic circuit 38 is substantially symmetrical when viewed in the X direction, the magnetic sensor 51 positioned at the center of the symmetry detects substantially no magnetic flux leakage in the X direction. Therefore, the magnetic sensor 51 of the stepping motor 47 having an encoder is not influenced by the external disturbance magnetic field, thereby realizing a high-precision actuator system.

As described above, according to Example 1, a system can be provided which includes the stepping motor having an encoder for zooming and the linear actuator for focusing, instead of a system using a conventional stepping motor. Therefore, the zooming function can have a transporting speed of about 30–2000 pps. Hyper-high-speed or hyper-slow-speed zooming can be performed. A high-performance lens barrel and a video camera using the same can be provided.

Further, when the closed loop control is used, the angle of rotation and torque can be controlled, thereby realizing low power consumption and low noise. As to focusing, high resolution and high precision can be obtained in addition to a high response capability by use of the magnetic sensor, thereby realizing excellent focusing characteristics. Furthermore, the external disturbance magnetic field can only be reduced by the arrangement of the magnetic sensor described above. Thus, a part such as a shield is not used, in contrast to the conventional method, thereby achieving low cost and preventing the size of the lens barrel from being increased with an increase in space for such parts. A small-sized and lightweight lens barrle can therefore be provided.

Needless to say, the same effects can be obtained even when the polarity of the main magnet of the linear actuator of Example 1 as shown in FIGS. 2, 5, and 6 is reversed.

In the linear actuator of Example 1, the magnetic sensor is provided on the lens barrel at the fixed side and the magnetic scale is provided on the lens moving frame at the moving side. Alternatively, the magnetic scale is provided on the lens barrel at the fixed side and the magnetic sensor is provided on the lens moving frame at the moving side. In this case, it is needless to say that the same effects can be obtained.

Although a magnetoresistance type magnetic sensor including the MR element is used in Example 1, a magnetic sensor of any type can be used so long as it puts out an output signal corresponding to the intensity of magnetic force.

Example 2

Figure 7:
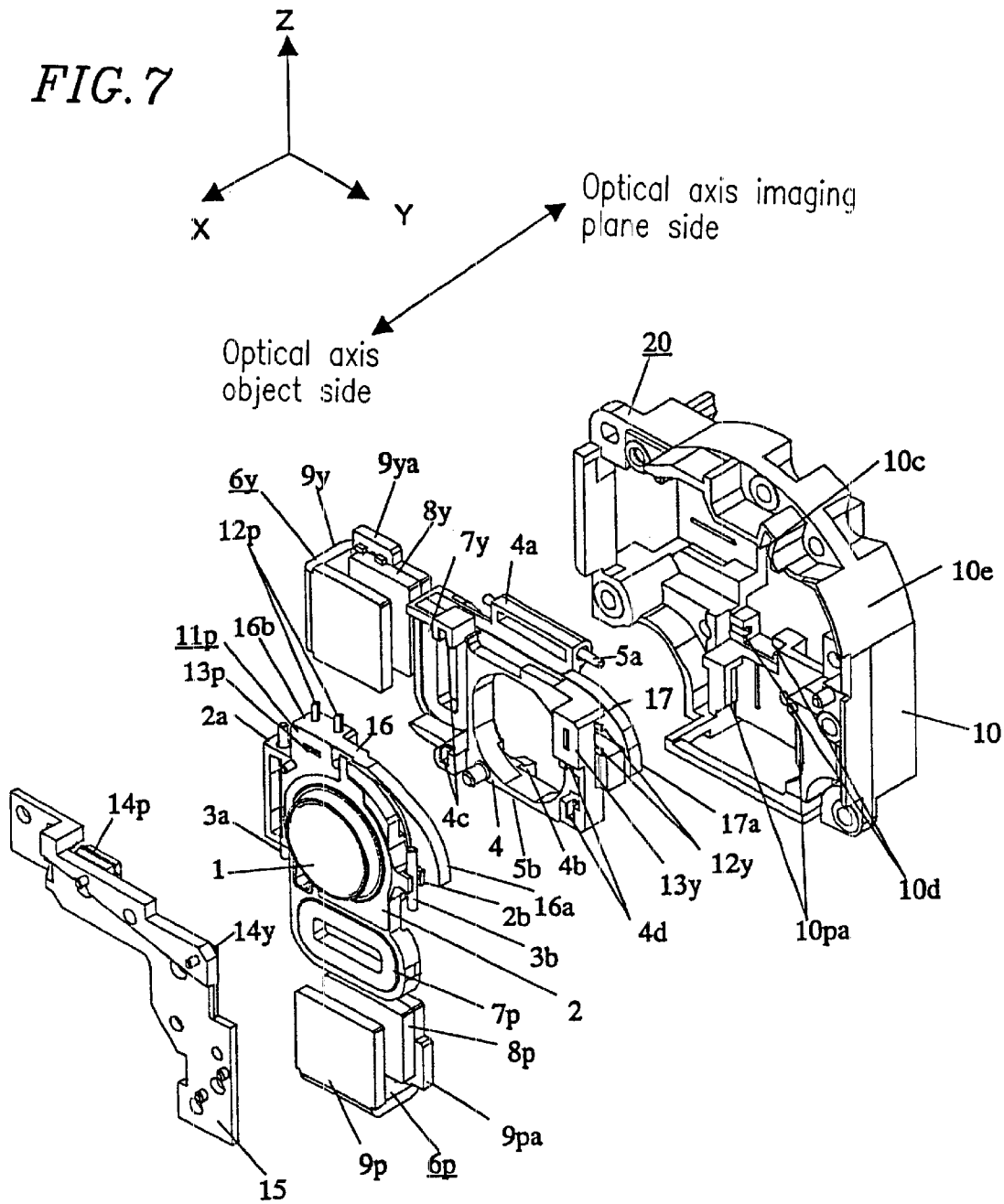
FIG. 7 is a rough perspective view of a lens barrel including an image shake compensation device and a linear actuator according to Example 2 of the present invention.
Figure 8:
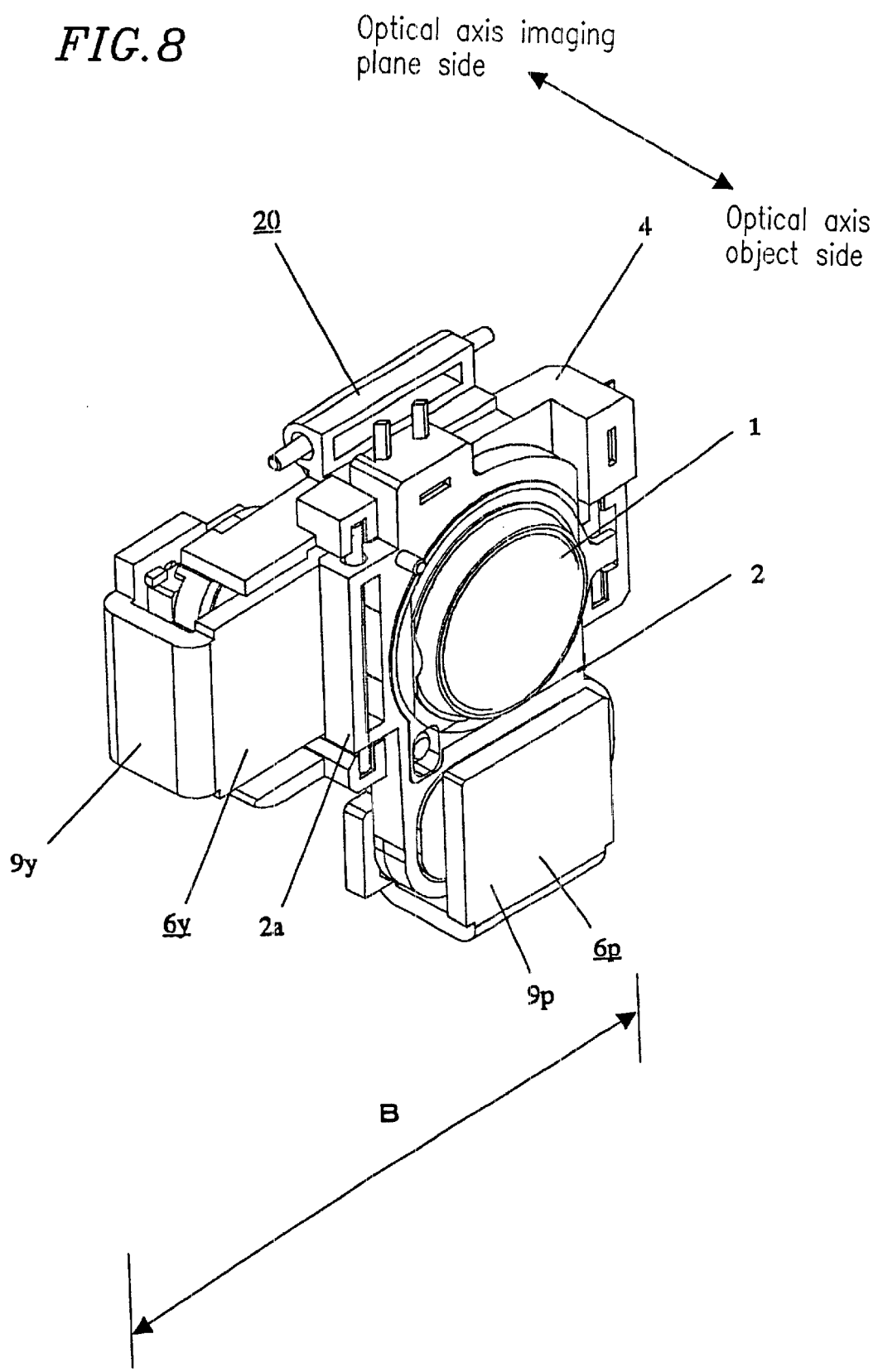
FIG. 8 is a perspective view of key parts of the is image shake compensation device according to Example 2 of the present invention.
Figure 9:
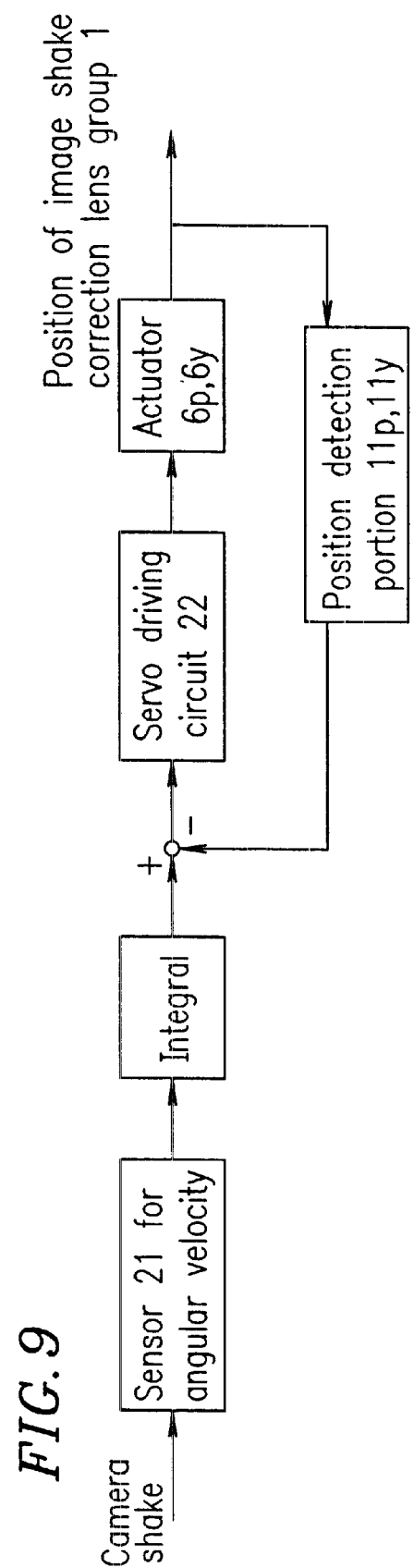
FIG. 9 is a block diagram of the image shake compensation device according to Example 2 of the present invention.

Next, a second embodiment of the present invention will be described with reference to FIGS. 7 through 9. FIG. 7 is a rough perspective view of a lens barrel including an image shake compensation device and a linear actuator according to Example 2 of the present invention. FIG. 8 is a perspective view of key parts of the image shake compensation device. FIG. 9 is a block diagram of an image shake compensation circuit. The parts described above are indicated by the same reference numerals and their descriptions are omitted.

A first lens group for compensating image shake when taking a picture is fixed on a holding frame 2 capable of moving in the Z direction as shown in FIG. 7. Hereinafter, the holding frame 2 is referred to as a pitching moving frame 2. The pitching moving frame 2 can be moved smoothly via two pitching shafts 3a and 3b by providing a bearing 2a and a detent 2b on a side opposite to the bearing 2a. An electromagnetic actuator 6p is also provided under the pitching moving frame 2.

The electromagnetic actuator 6p includes a coil 7p attached to the pitching moving frame 2, a magnet 8p, and a yoke 9p attached to a fixing frame 10 described later. Protrusions 9pa are provided on opposite sides of the yoke 9p. Engagement holes 10pa capable of engaging with the protrusions 9pa are provided in the fixing frame 10, laying in a direction substantially parallel to a direction along which the pitching moving frame 2 is smoothly moved. Therefore, the yoke 9p is fixed to the fixing frame 10 without adhesion or the like. Two pole magnetization is provided in one surface of the magnet 8p which is fixed to the U-shaped yoke 9p, one side of which is open.

A frame 4 for moving the image shake compensation lens group 1 in the Y direction is attached to the pitching moving frame 2 at the optical axis imaging plane side thereof. Hereinafter, the holding frame 4 is referred to as a yawing moving frame. Fixing members 4c and 4d are provided in the yawing moving frame 4 at the optical axis object side for fixing the opposite ends of the two pitching shafts 3a and 3b which are used for smoothly moving the pitching moving frame 2 as described above. Similarly, the yawing moving frame 4 is moved smoothly via two yawing shafts 5a and 5b by providing a bearing 4a and a detent 4b on a side opposite to the bearing 4a. The two yawing shafts 5a and 5b are fixed to fixing portions 10c and 10d of the fixing frame 10 provided at the optical axis imaging plane side of the yawing moving frame 4. An electromagnetic actuator 6y is provided at the left side of the yawing moving frame 4.

The electromagnetic actuator 6y includes a coil 7y attached to the yawing moving frame 4, a magnet 8y, and a yoke 9y attached to the fixing frame 10. Protrusions 9ya are provided on opposite sides of the yoke 9y. Engagement holes 10ya capable of engaging with the protrusions 9ya are provided in the fixing frame 10, laying in a direction substantially parallel to a direction along which the yawing moving frame 4 is smoothly moved. Therefore, the yoke 9y is fixed to the fixing frame 10 without adhesion or the like. Two pole magnetization is provided in one surface of the magnet By which is fixed to the U-shaped yoke 9p one side of which is open.

Therefore, when a current flows through the coil 7p of the pitching moving frame 2, electromagnetic force is generated in the Z direction by the magnet 8p and the yoke 9p. Similarly, when a current flows through the coil 7y of the yawing moving frame 4, electromagnetic force is generated in the Y direction by the magnet By and the yoke 9y. In this way, the image shake compensation lens group 1 is driven in the two directions substantially perpendicular to the optical axis by the two electromagnetic actuators 6p and 6y.

Next, the position detection portion will be described. A detection portion 11p provided at the upper portion in the Z direction of the pitching moving frame 2 includes a light emitting element 12p (such as LEDs), a slit 13p, and a light receiving element 14p (PSD) attached to a PSD substrate 15. Similarly, a detection portion 11y provided at the upper portion in the Y direction of the pitching moving frame 4 includes a light emitting element 12y (such as LEDs), a slit 13y, and a light receiving element 14y (PSD) attached to the PSD substrate 15.

The light emitting elements 12p and 12y emit light beams through the respective slits 13p and 13y. The light beams which have passed through the slits 13p and 13y enter the respective light receiving elements 14p and 14y. Therefore, the movement of the image shake compensation lens group 1 is equivalent to the movement of the light receiving elements 14p and 14y. The light receiving elements 14p and 14y output information on the positions of: the light beams incident to light receiving surfaces thereof as two current values. The output values are calculated to detect the position of the lens group 1.

Next, a flexible print cable connected between the pitching and yawing moving frames 2 and 4 and the fixing frame 10 will be described.

A flexible print cable 16 is attached onto an upper surface of the pitching moving frame 2 in such a manner as to surround the compensation lens group 1. The flexible print cable 16 is electrically connected between the coil 8p and the light emitting element 12p. The flexible print cable 16 is fixed at a portion 16b thereof to the pitching moving frame 2, being oriented perpendicular to the smooth moving direction Z. The other end 16a of the flexible print cable 16 is fixed to a portion 10e of a side of the fixing frame 10, the end 16a being parallel to the smooth moving Z direction of the pitching moving frame 2.

Therefore, the coil 7p and the light emitting element 12p are connected to a circuit (not shown) for supplying a driving current. Similarly, a flexible print cable 17 is attached onto a side of the yawing moving frame 4. The flexible print cable 17 is electrically connected between the coil 7y and the light emitting element 12y. The flexible print cable 17 is fixed at a portion 17b thereof to the yawing moving frame 4, the flexible print cable 17 being oriented parallel to the smooth moving direction Y. The other end 17a of the flexible print cable 17 is fixed to the portion 10e on the side of the fixing frame 10, the other end 17a being substantially parallel to the smooth moving direction Z of the pitching moving frame 2. Therefore, the coil 7y and the light emitting element 12y are connected to a circuit (not shown) for supplying a driving current. Thus, the shift unit 20 for image shake compensation includes the above-described parts.

Further, the shift unit 20 has a structure as shown in FIG. 8 illustrating an assembly of the shift unit such that the dimensions thereof in the lens diameter direction are reduced. The pitching moving frame 2 and the yawing moving frame 4 have different heights in the optical axis direction. The pitching moving frame 2 is provided at the optical axis object side. The yoke 9y of the shift actuator 6y for yawing is inserted into the optical axis imaging plane side of the bearing 2a of the pitching moving frame 2 in such a manner that the yoke 9y overlaps the bearing 2a when viewed in the optical axis direction. Therefore, a dimension in the radius direction of the shift unit 20, i.e., a width B, can be reduced, leading to a downsizing of the shift unit 20.

The operation of the lens barrel thus constructed will be described.

A hand movement acting on a video camera including the image shake compensation device is detected by two angular velocity sensors 21 (not shown) provided about 90° apart from each other. The outputs of the angular velocity sensors 21 are integrated with respect to time. The resulting value is converted to an angle of hand-shake. The resulting angle is then converted to target position information of the image shake compensation lens group 1. A servo circuit 22 calculates a difference between information on the target position and information on the present position of the image shake compensation lens group 1, in order to move the image shake compensation lens group 1 in accordance with the target driving position information. The resulting difference is transferred as a signal to the electromagnetic actuators 6p and 6y. The electromagnetic actuators 6p and 6y drive the image shake compensation lens group 1 based on the signal. The movement of the image shake compensation lens group 1 is detected by the position detection portions 11p and 11y, and is fed back to compensate the image shake in the video camera.

The yawing moving frame 4 is driven in the Y direction in the following way. A current is supplied via the flexible print cable 17 to the coil 7y in response to an instruction from the driving circuit. The flow of the current causes the electromagnetic actuator 6y to generate force in the Y direction which drives the yawing moving frame 4. The pitching moving frame 2 is driven in the Z direction in the following way. A current is supplied via the flexible print cable 16 to the coil 7p in response to an instruction from the driving circuit. The flow of the current causes the electromagnetic actuator 6p to generate force in the Z direction which drives the pitching moving frame 2. Therefore, the compensation lens group 1 can be arbitrarily moved in a plane perpendicular to the optical axis, thereby making it possible to compensate image shake generated by hand movement.

As described above, according to Example 1, the pitching and yawing moving frames for moving the compensation lens group in directions perpendicular to the optical axis are provided in the lens barrel including the shift unit for compensating image shake. The pitching and yawing moving frames are positioned at different heights with respect to the optical axis. The actuator of the yawing moving frame is provided in such a manner as to overlap the pitching moving frame when viewed in the optical axis direction. Therefore, the dimensions of the shift unit in the width direction thereof can be reduced, thereby realizing a downsizing of the lens barrel including the shift unit.

Example 3

Figure 10:
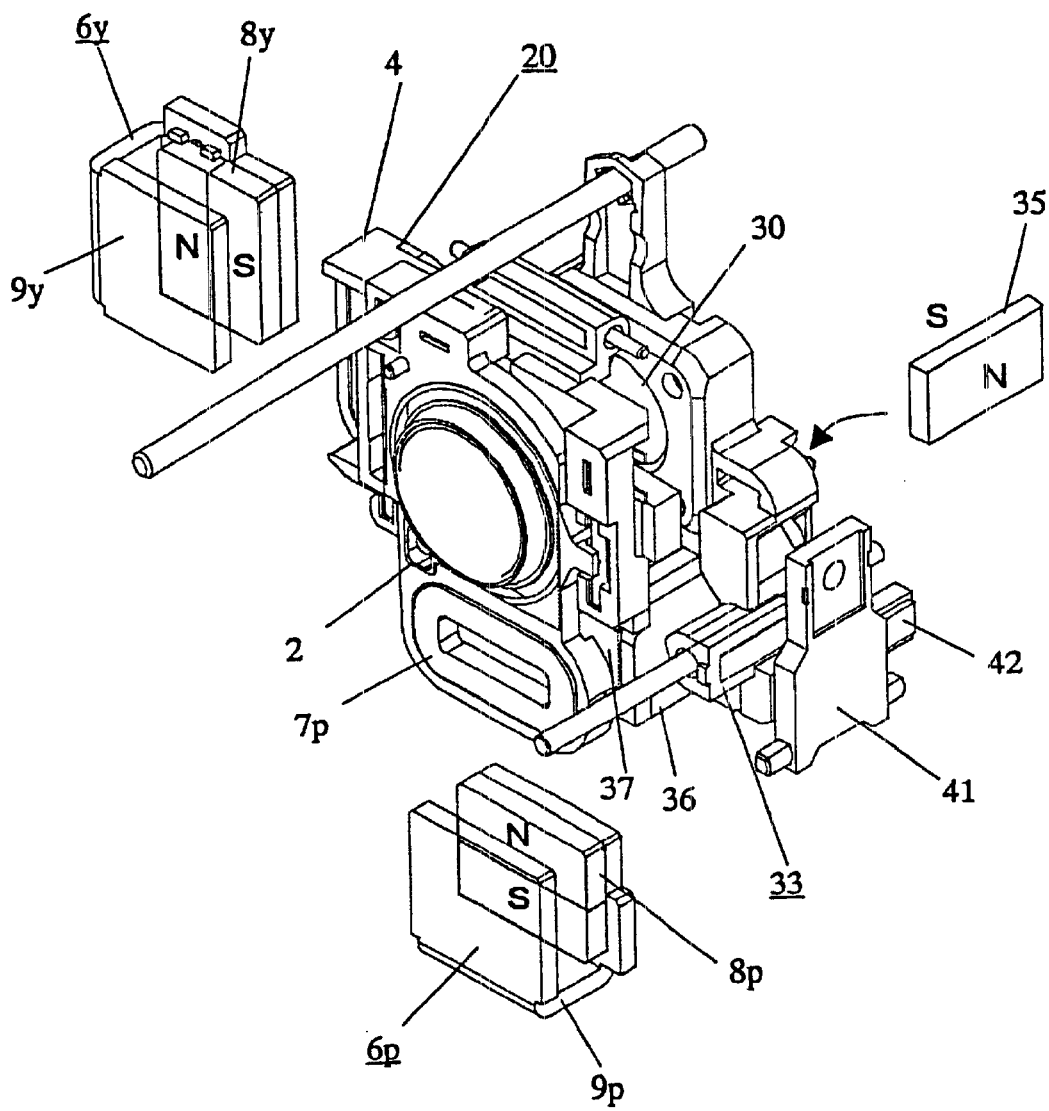
FIG. 10 is a rough perspective view of a lens barrel including an image shake compensation device and a linear actuator according to Example 3 of the present invention.
Figure 11:
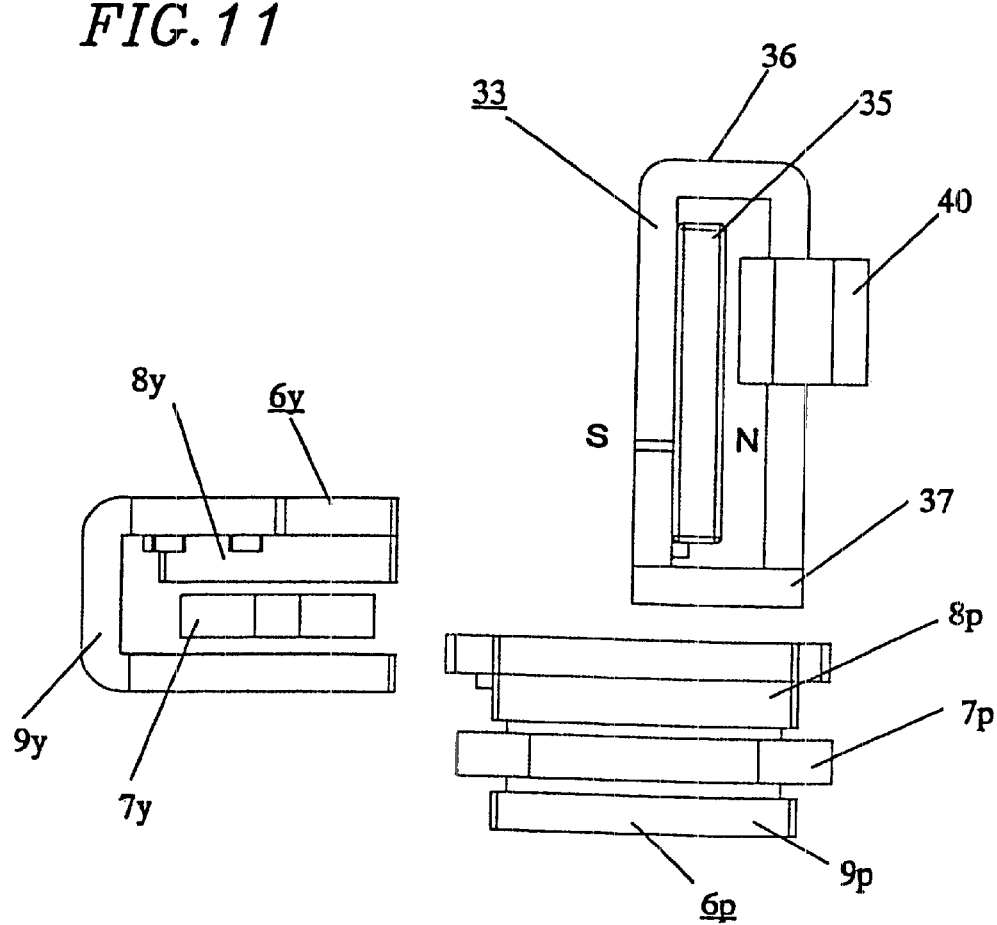
FIG. 11 is a diagram showing an arrangement of a yoke of an actuator according to Example 3 of the present invention.
Figure 12:
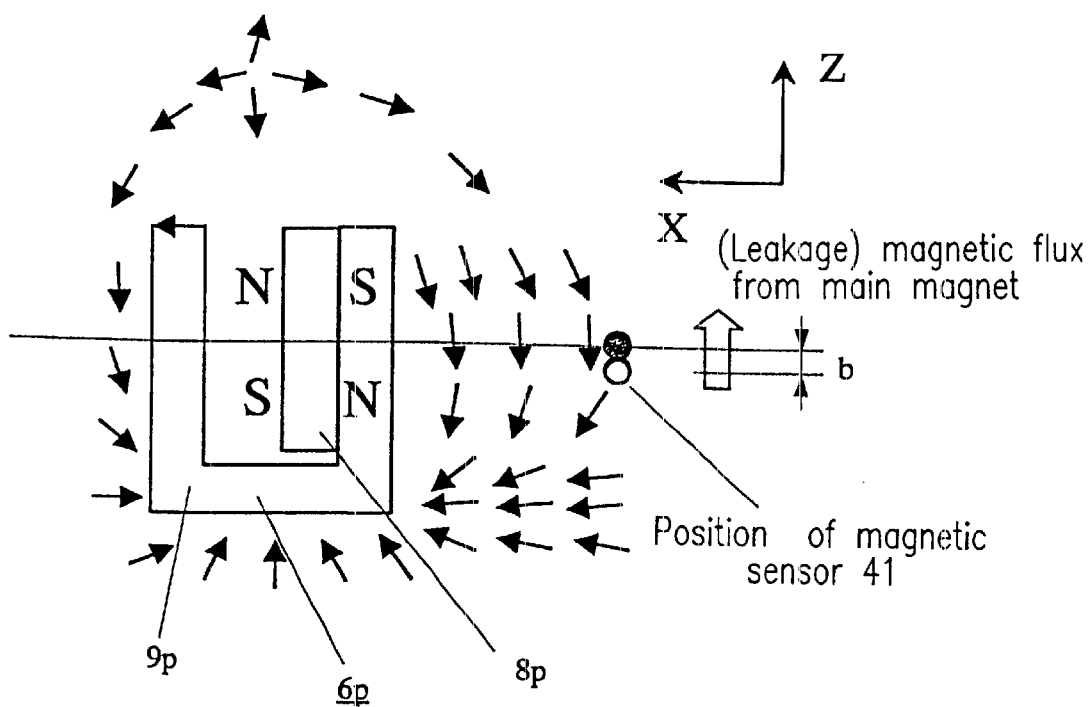
FIG. 12 is a diagram showing a flow of magnetic flux of a magnet of a shift actuator for the image shake compensation device according to Example 3 of the present invention.
Figure 13:
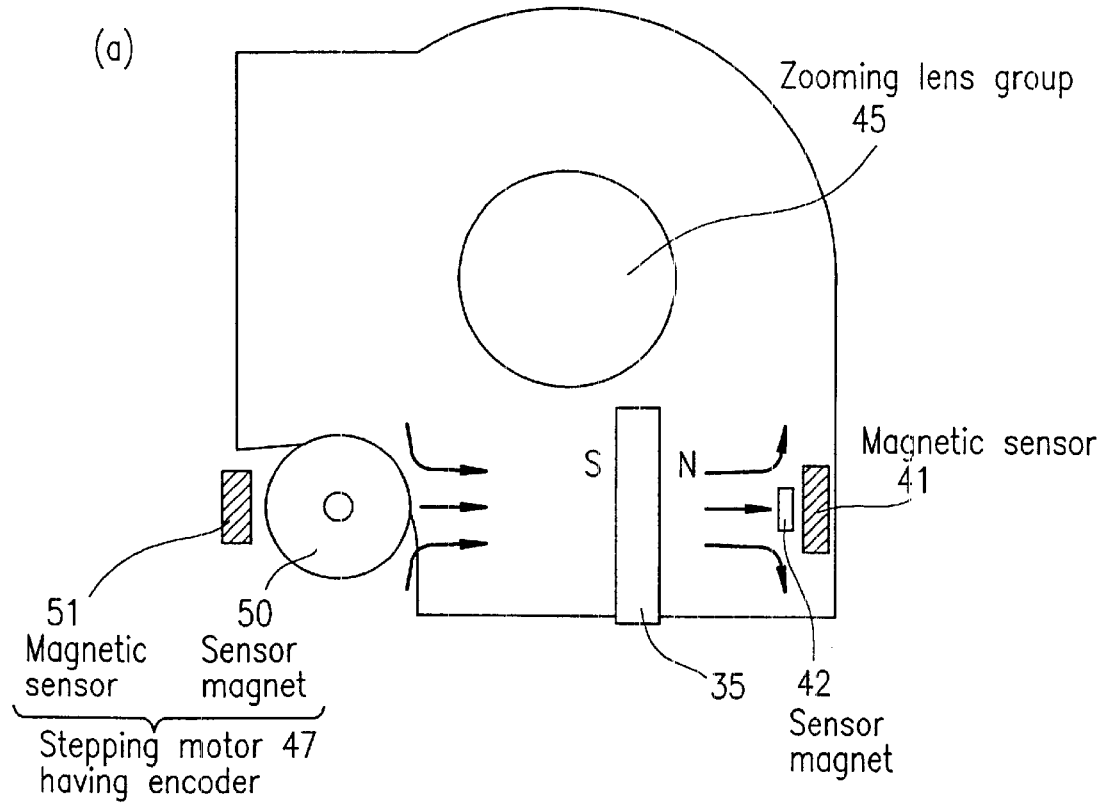
FIGS. 13(a) and 13(b) are diagrams showing a flow of magnetic flux of a magnet of a linear actuator according to Example 3 of the present invention, with FIG. 13(a) being a top view and FIG. 13(b) being a side view.
Figure 13:
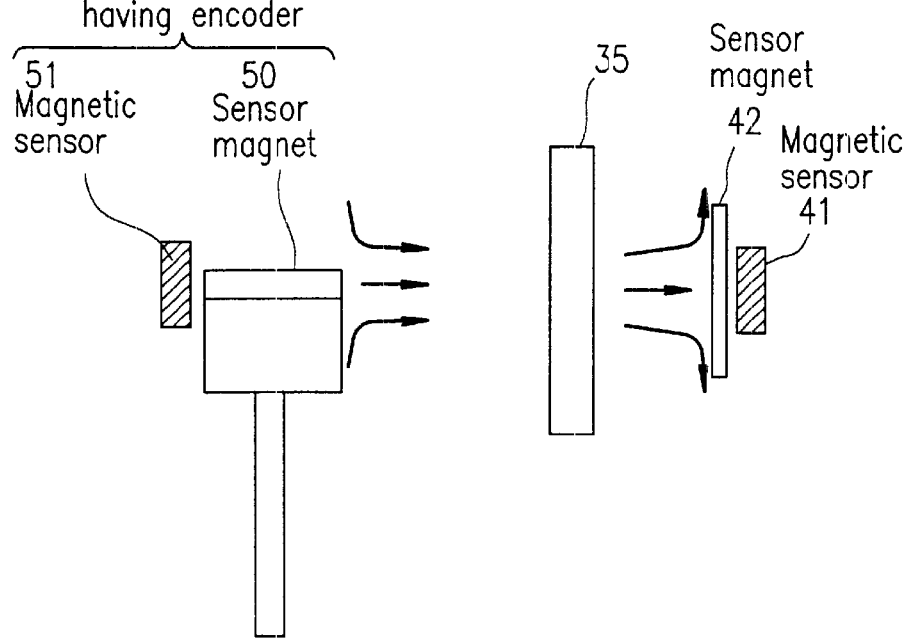

Next, a third embodiment of the present invention will be described with reference to FIGS. 10 through 13. FIG. 10 is a rough perspective view of a lens barrel including an image shake compensation device and a linear actuator according to Example 3 of the present invention. FIG. 11 is a diagram showing an arrangement of a yoke of the linear actuator. FIG. 12 is a diagram showing a flow of magnetic flux of a shift actuator for the image shake compensation device. FIG. 13 is a diagram showing a flow of magnetic flux of a magnet of the linear actuator according to Example 3 of the present invention. The parts described above are indicated by the same reference numerals and their descriptions are omitted.

A shift unit 20 of Example 3 is identical to that described in Example 2. For the sake of. simplicity, a fixing frame 10 of the shift unit 20 is omitted from FIG. 11. The direction of magnetization of a pitching magnet 8p, a yawing magnet 8y and a magnet 35 of a linear actuator 33 is as shown in FIGS. 12 and 13(a). A pitching moving frame 2 and the yawing moving frame 4 are positioned at different heights with respect to the optical axis direction. The pitching moving frame 2 is provided on the optical axis object side.

A main yoke 36 and a side yoke 37 of the linear actuator 33 for driving a focusing lens group 30 as described in Example 1 are provided on the optical imaging plane side of a yoke 9p included in a pitching actuator 6p. A top view of the arrangement of the actuators of the shift unit 20 and the linear actuator 33 is provided in FIG. 11. A magnetic sensor 41 is used as a position detection portion of the linear actuator 33. As previously described, an influence of an external disturbance magnetic field causes distortion of the sensor output, leading to deterioration in performance of the actuators.

Therefore, in order to provide the shift unit 20 and the linear actuator 33 in a single lens barrel, magnetic flux leakage from the shift unit 20 and the linear actuator 33 needs to be reduced. Although a solution to provide such a reduction in magnetic flux leakage is to enlarge the gap between the shift unit 20 and the linear actuator 33, this leads to an upsizing of the lens barrel. Therefore, in order to achieve a downsizing in the optical axis direction, the magnetic flux leakage needs to be reduced while keeping a small gap between the shift unit 20 and the linear actuator 33. A reduction method will be described.

The magnetic sensor 41 of the linear actuator 33 is provided at the center position of a magnetic circuit 38 with respect to two directions, i.e., the optical axis direction (X direction) and a direction perpendicular thereto (Z direction), where an influence of an external disturbance magnetic field is substantially zero, thereby reducing the magnetic flux leakage. In this situation, when the magnetization of the magnet 8p of the pitching actuator 6p is as shown in FIG. 10, such a position of the magnetic sensor 41 leads to the occurrence of the magnetic flux leakage as shown in FIG. 12 due to an influence of the pitching actuator 6p. The position of the magnetic sensor 41 described in Example 1 is a position in the Z axis direction indicated by the white circle.

Since magnetic flux leakage exists in the −Z direction due to the influence of the pitching actuator 6p, the magnetic flux leakage enters the magnetic sensor 41 at the position indicated by the white circle. When the magnetization of the main magnet 35 of the linear actuator 33 is as shown in FIG. 10, magnetic flux leakage occurs as indicated by the white circle. Therefore, the magnetic sensor 41 is shifted by distance b in the Z direction to a position indicated by the black circle. As a result, the magnetic flux leakage from the pitching actuator 6p toward the Z axis direction and the magnetic flux leakage from the linear actuator 33 toward the Z axis direction cancel each other out, whereby the amount of the magnetic flux leakage which enters the magnetic sensor 41 is substantially zero.

The pitching actuator 6p has no influence on the magnetic sensor 41 with respect to the X direction. Moreover, since the position in the X direction of the magnetic sensor 41 is not changed, the magnetic sensor 41 is positioned at the magnetic center in the X direction of the magnetic circuit 38 of the linear actuator 33. Therefore, the linear actuator has no influence on the magnetic sensor 41. Note that the influence of the magnetic flux leakage from the yawing actuator 6y is small compared to the pitching actuator 6p because of the long distance from the yawing actuator 6y.

As described above, according to Example 3, the linear actuator can be provided in the lens barrel including the shift unit for compensating hand-shake, since the linear actuator is positioned so that the linear actuator is not influenced by an external disturbance magnetic field. Therefore, the focusing lens group is driven by the linear actuator, so that a high-speed response capability is achieved. In addition, high resolution and high precision can be obtained using the magnetic sensor, thereby realizing an excellent focusing property.

Further, the reduction of magnetic flux leakage is achieved only by devising the position of the magnetic sensor provided, in contrast to the conventional technique. Apart such as a shield is not required, thereby achieving low cost and preventing the size of the lens barrel from being increased with an increase in space for parts.

Further, the pitching and yawing moving frames of the shift unit are provided at different heights in the optical axis direction. The linear actuator for driving a focusing lens is provided immediately at the optical axis imaging plane side of the pitching actuator provided at the optical axis object side. Therefore, the dimension in the width direction can be shortened while a space in the optical axis direction is effectively used, thereby realizing a downsizing of the lens barrel.

Needless to say, the same effects can be obtained in Example 3 even if the polarity of the magnets of the pitching actuator and the linear actuator of the shift unit as shown in FIG. 10 is reversed.

Example 4

Figure 14:
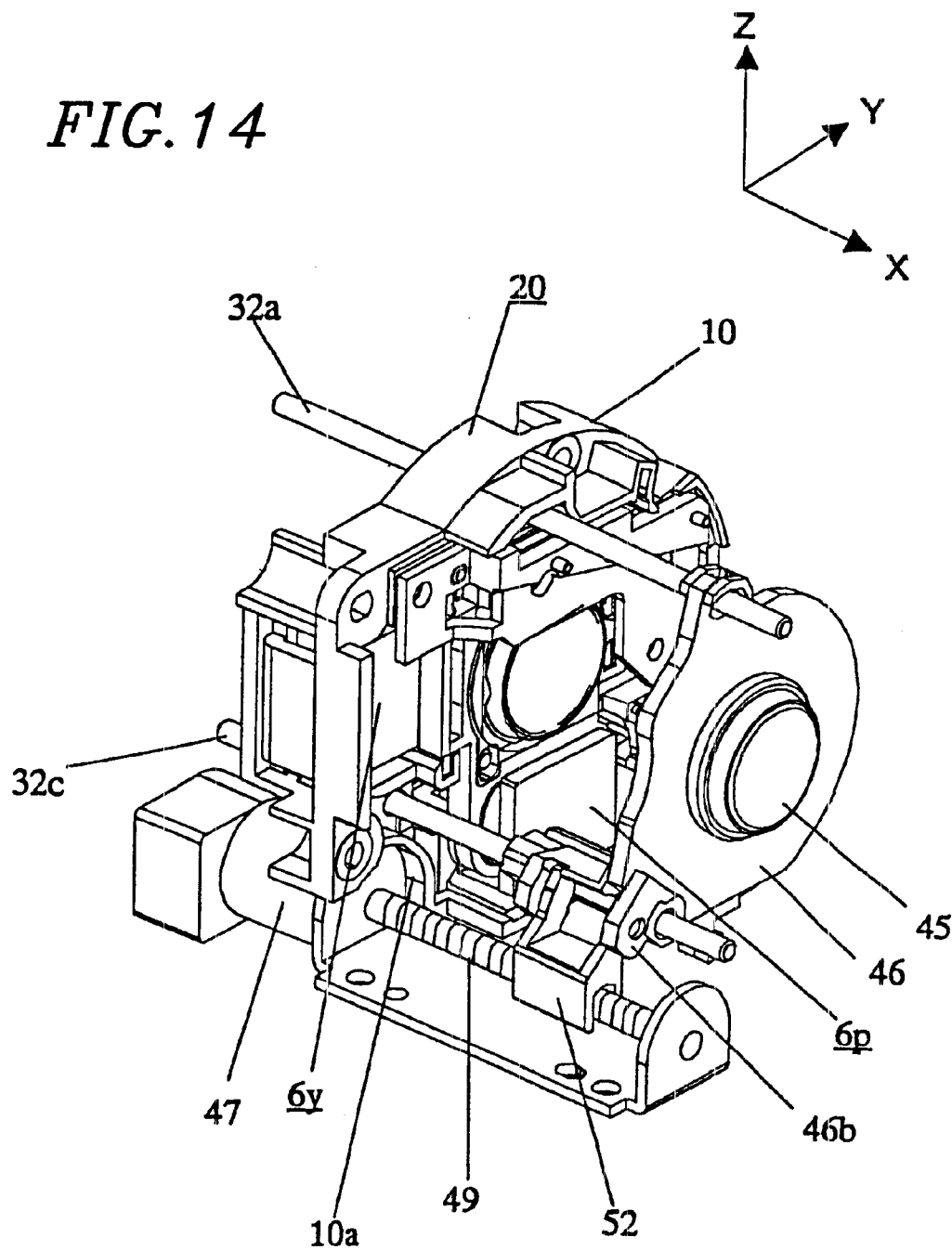
FIG. 14 is a rough perspective view of a lens barrel including an image shake compensation device and a stepping motor having an encoder according to Example 4 of the present invention.
Figure 15:
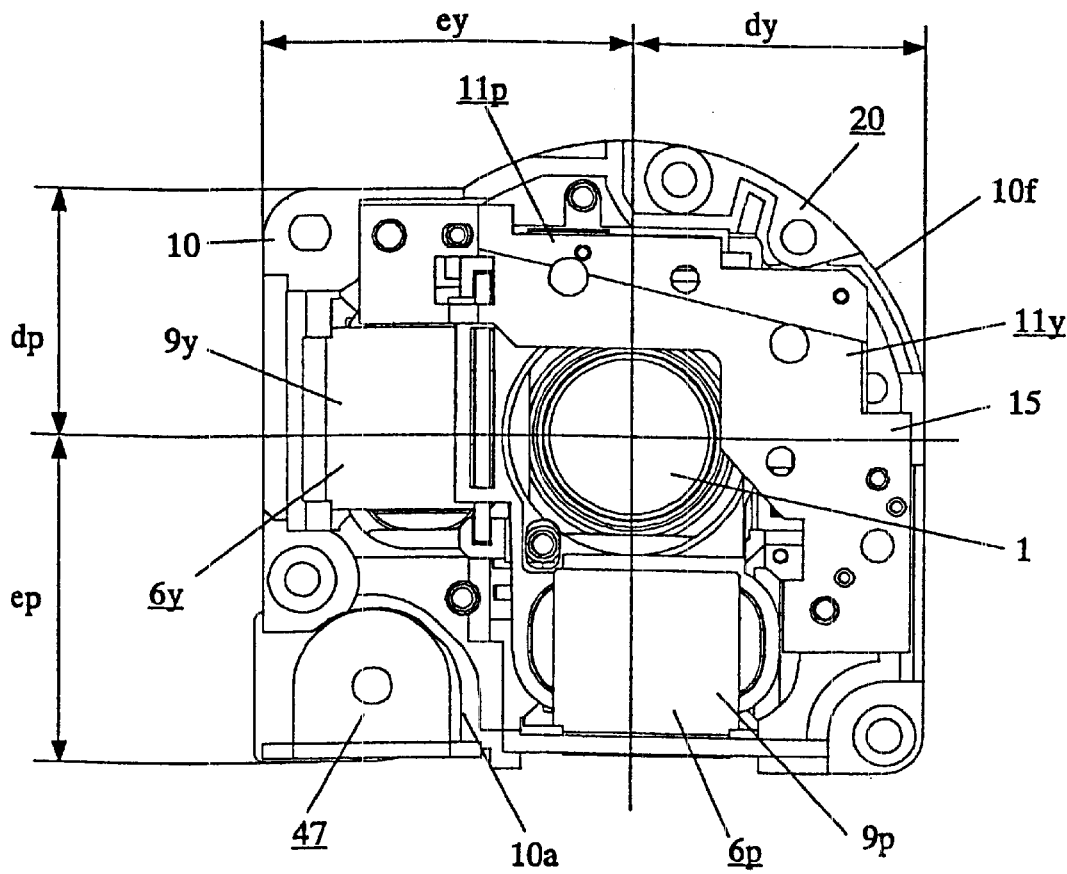
FIG. 15 is a front view of the lens barrel according to Example 4 of the present invention.

Next, a fourth embodiment of the present invention will be described with reference to FIGS. 14 through 15. FIG. 14 is a rough perspective view of a lens barrel including an image shake compensation device and a stepping motor having an encoder according to Example 4 of the present invention. FIG. 15 is a front view of the lens barrel. The parts described above are indicated by the same reference numerals and their descriptions are omitted.

A zooming lens group 45 is held by a zooming lens moving frame 46. A sleeve portion 46a of the lens moving frame 46 is coupled with a screw member 52. The screw member 52 is engaged with a lead screw 49 as the output axis of a stepping motor 47 having an encoder. Therefore, when the stepping motor 47 having an encoder is rotated, the zooming lens moving frame 46 is moved in the optical axis direction along guide poles 32a and 32c. A depression 10a is provided in the fixing frame 10 of the shift unit 20 for placing the stepping motor 47 having an encoder at a position such that the stepping motor 47 having an encoder does not overlap regions where the shift actuators 6p and 6y are positioned.

The depression 10a is provided between the yokes 9p and 9y of the pitching and yawing actuators 6p and 6y of the shift unit 20. In the shift unit 20, the widths of portions ep and ey of the yokes 9p and 9y are larger than portions dp and dy of position detection portions 11p and 11y with respect to the center of the optical axis. Effective use of the portions ep and ey is a key factor in the reduction of the dimension of the lens barrel from the center of the optical axis.

The portions dp and dy on the opposite sides are substantially in the shape of a circular arc 10f as shown in FIG. 15. This allows the shape of the outer covering of the video camera, which is to be provided at the outside of the portions, to also be substantially in the shape of a circular arc. Such a video camera having an excellent design can be realized.

The stepping motor 47 having an encoder is provided in such a manner that the engaging portion of the screw member 52 of the stepping motor 47 having an encoder is positioned at the depression 10a of the fixing frame 10. Therefore, the stepping motor 47 having an encoder can be provided at a position close to the optical axis without interference with the shift unit 20, thereby making it possible to reduce the diameter of the lens barrel.

As described above, according to Example 4, a depression is provided in a shift lens unit. A stepping motor for zooming is provided in the depression. Therefore, the lens barrel of Example 4 can have a reduced size in the radius direction as compared with the conventional lens barrel, even when the lens barrel of Example 4 is a lens barrel which includes an image shake compensation device having two shift actuators for driving the compensation lens group in the optical axis direction and a direction perpendicular thereto.

Although a stepping motor having an encoder is described as an actuator for driving a zoom lens group in the description of Example 4, it is needless to say that the same effects can be obtained when the conventional stepping motor is used.

Example 5

Figure 16:
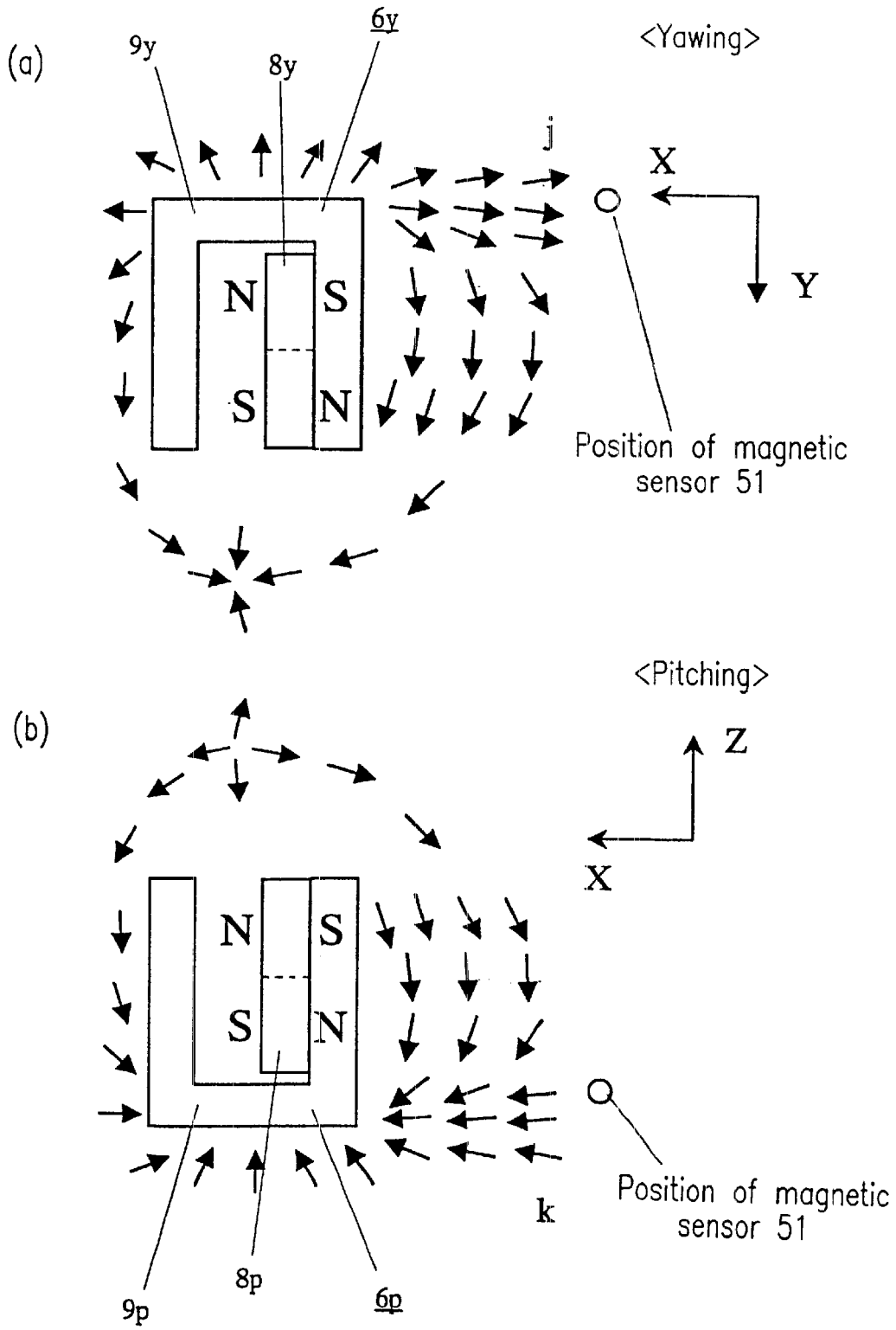
FIGS. 16(a) and 16(b) are diagrams showing a flow of magnetic flux of an image shake compensation device according to Example 5 of the present invention, with FIG. 16(a) showing the flow yawing and FIG. 16(b) showing the flow pitching.
Figure 17:
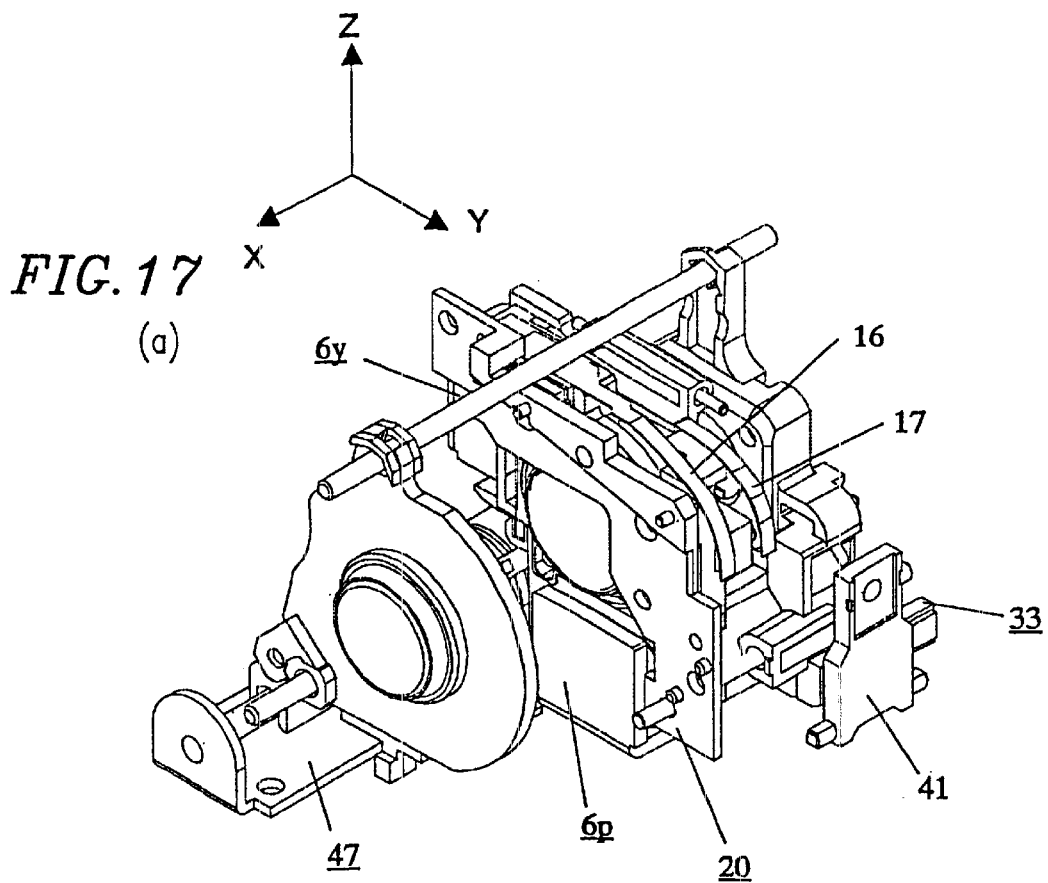
FIGS. 17(a) and 17(b) are diagrams of the lens barrel according to Example 5 of the present invention to which a linear actuator is added, with FIG. 17(a) showing the front view and FIG. 17(b) showing the opposite view.
Figure 17:
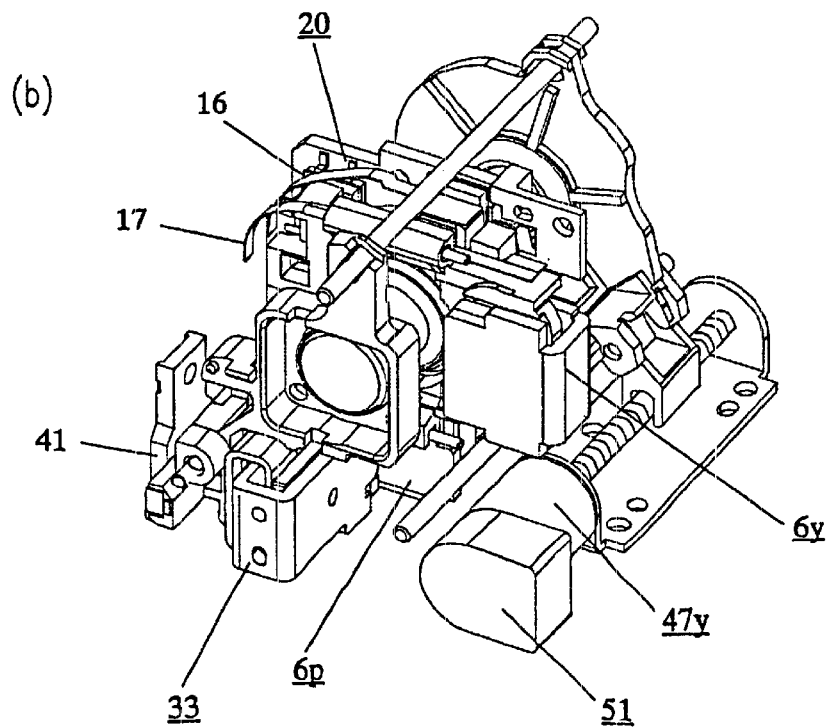

Next, a fifth embodiment of the present invention will be described with reference to FIGS. 16 through 17. FIG. 16 is a diagram showing a flow of magnetic flux leakage of an image shake compensation device according to Example 5 of the present invention. FIG. 17 is a diagram of the lens barrel shown in FIG. 14 to which a linear actuator is added. The parts described above are indicated by the same reference numerals and their descriptions are omitted.

In Example 5, the shift unit 20 and the stepping motor 47 having an encoder are identical to those described in Example 4. Actuators for moving the image compensation lens group 1 are provided along the optical axis direction and a direction perpendicular thereto. The stepping motor 47 having an encoder for zooming is provided between the yokes 9p and 9y of the pitching and yawing actuators 6p and 6y, respectively.

In Example 1, the magnetic sensor 51 is provided at the magnetic center of the magnetic circuit 38 of the linear actuator 33 so that an external disturbance magnetic field of the magnetic sensor 51 for the stepping motor 47 having an encoder is reduced. However, since the shift unit 20, i.e., the pitching and yawing actuators 6p and 6y, are added, magnetic flux leakage from the two actuators needs to be reduced. A reduction method will be described.

The magnet 8p of the pitching actuator 6p is magnetized in such a manner that the upper side thereof has the N pole and the lower side thereof has the S pole with respect to a direction perpendicular to the optical axis when viewed from the optical axis object side as shown in FIG. 10. The magnet 8y of the pitching actuator 6y is magnetized in such a manner that the right side thereof has the N pole and the left side thereof has the S pole with respect to a direction perpendicular to the optical axis when viewed from the optical axis object side as shown in FIG. 10. In other words, the polarity of the pitching and yawing actuators are opposite to each other. Therefore, in the magnetic circuit including a yoke and a magnet, the direction of a magnetic flux flowing in the yoke is opposite to the direction of a magnetic flux flowing in the yawing, since the polarity of the magnets are opposite to each other. As a result, the magnetic flux leakage are opposite to each other.

It is described in Example 1 that the magnetic flux leakage of the magnetic sensor 51 of the stepping motor 47 having an encoder needs to be reduced with respect to the X and Z directions. Initially, the flow of the magnetic flux leakage will be described. The magnetic flux leakage of the yawing actuator 6y flows in a direction indicated by arrow J at the position of the magnetic sensor 51 of the stepping motor 47 having an encoder shown in FIG. 16(a). On the other hand, the magnetic flux leakage of the pitching actuator 6p flows in a direction indicated by arrow k at the position of the magnetic sensor 51 of the stepping motor 47 having an encoder shown in FIG. 16(b).

Therefore, since the directions of the magnetic flux leakage of the pitching and yawing actuators 6p and 6y are opposite to each other at the position of the magnetic sensor 51, the magnetic flux leakage thereof cancels each other, thereby reducing the amount of the magnetic flux leakage which enters the magnetic sensor 51. As to the Z direction, there is no influence of the magnetic flux leakage, so that the amount of the magnetic flux leakage which enters the magnetic sensor 51 is small. Thus, the influence of the magnetic flux leakage can be eliminated with respect to the two directions, i.e., the X and Z directions, whereby the output of the magnetic sensor is not distorted and therefore a high level of position detection precision can be obtained.

Further, when the stepping motor 47 having an encoder, the linear actuator 33, and the shift unit 20 are provided at the positions of the stepping motor 47 having an encoder, the linear actuator 33 and at the positions of the shift unit 20 and the linear actuator 33, the influence of an external disturbance magnetic field is reduced and these can be provided in a single lens barrel as shown in FIG. 17. Note that the fixing frame 10 is omitted in FIG. 17 for the sake of simplicity.

As described above, according to Example 5, a lens barrel includes a shift unit for performing hand-shake compensation, improving the performance of the hand-shake compensation. A lens barrel also includes a stepping motor having an encoder, thereby achieving a transporting speed of about 30–2000 pps. Therefore, hyper-high-speed or hyper-slow-speed zooming can be performed. A high-performance lens barrel and a video camera using the same can be provided.

Further, when closed loop control is used, the angle of rotation and torque can be controlled, thereby realizing low power consumption and low noise. As to a reduction in magnetic flux leakage, a part such as a shield does not need to be used, in contrast to the conventional method, thereby achieving low cost and preventing the size of the lens barrel from being increased with an increase in space for parts. A small-sized and lightweight lens barrel can be provided.

When the stepping motor having an encoder as a magnetic sensor is provided at the substantial center of the magnetic circuit of the linear actuator as described in Example 4; and the linear actuator is provided at the optical axis imaging plane side of the pitching actuator of the shift unit as described in Example 5, a linear actuator for driving a focusing lens can be incorporated into the lens barrel including the shift unit and the stepping motor having an encoder. Therefore, in addition to a high-speed response capability, since the magnetic sensor is used, high resolution and a high precision property are obtained, thereby realizing an excellent focusing property.

Needless to say, the same effects can be obtained even if the polarity of the magnets of the pitching and yawing actuators of the shift unit and the magnet of the linear actuator as shown in FIG. 10 is reversed.

Example 6

Figure 18:
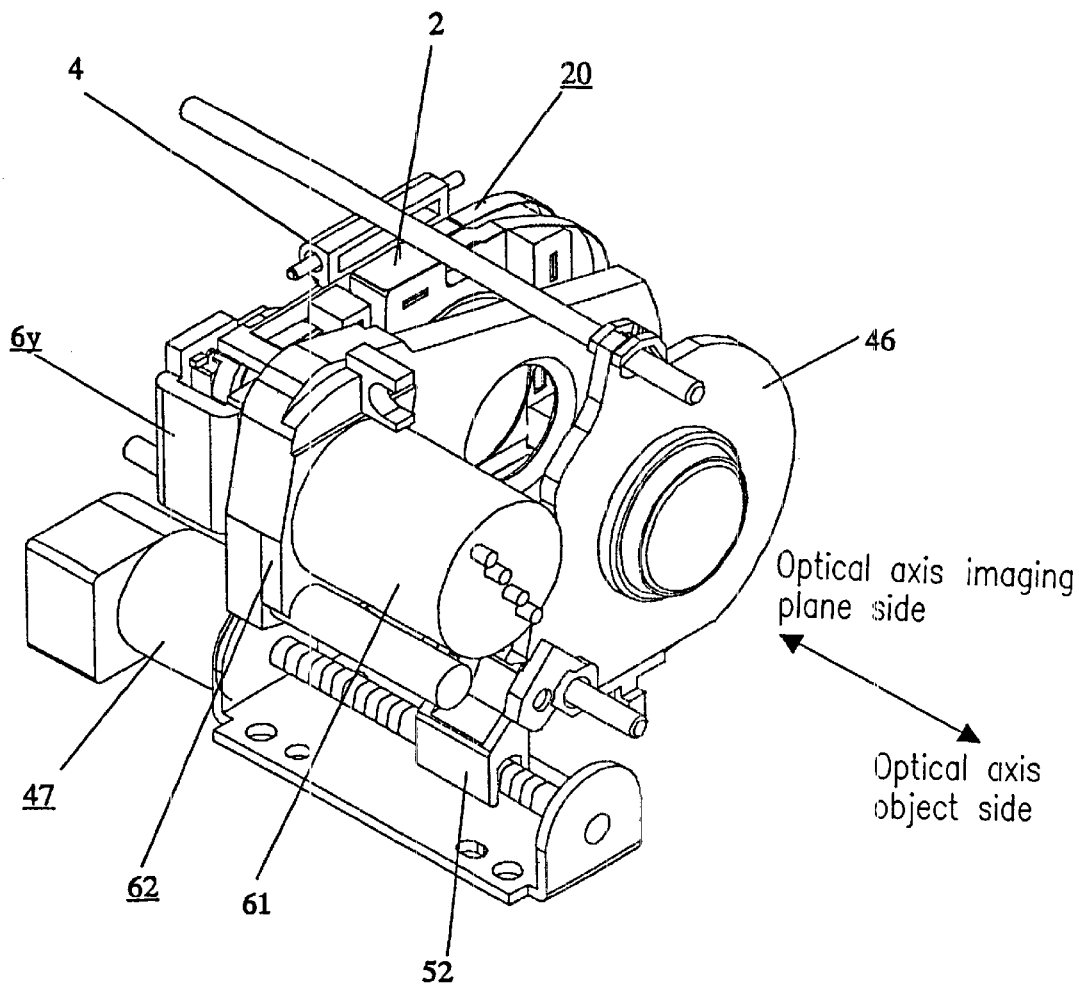
FIG. 18 is a rough perspective view of a lens barrel including an image shake compensation device, a stepping motor having an encoder, and an iris unit according to Example 6 of the present invention.
Figure 20:
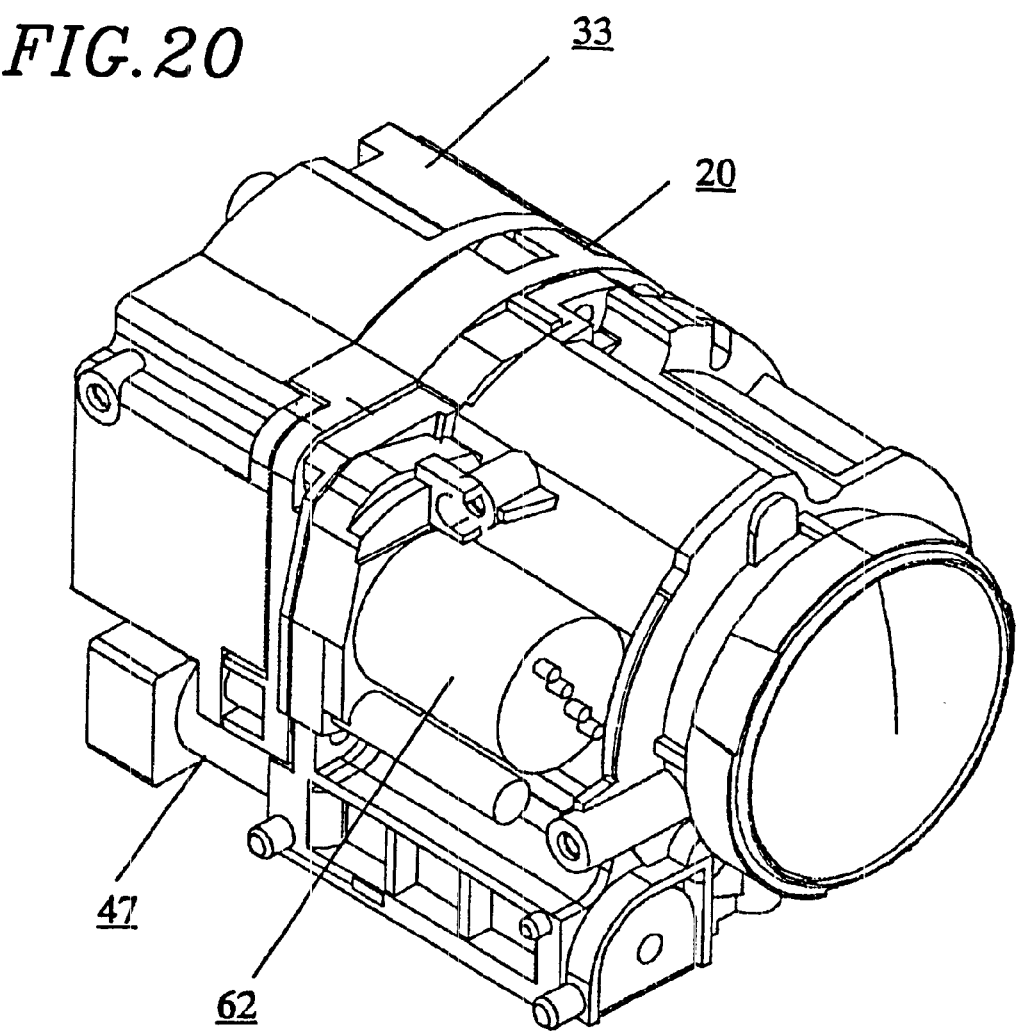
FIG. 20 is a perspective view of the lens barrel according to Example 6 of the present invention.

Next, a sixth embodiment of the present invention will be described with reference to FIGS. 18 through 20. FIG. 18 is a rough perspective view of a lens barrel including an image shake compensation device, a stepping motor having an encoder, and an iris unit according to Example 6 of the present invention. FIG. 19 is a front view of the lens barrel. FIG. 20 is a perspective view of the lens barrel. The parts described above are indicated by the same reference numerals and their descriptions are omitted.

The shift unit 20 of Example 6 is identical to that described in Example 2. The pitching moving frame 2 and yawing moving frame 4 of the shift unit 20 is provided at different heights with respect to the optical axis direction, and the yawing moving frame 4 is provided at the optical axis imaging plane side. A meter 61 of an iris unit 62 is provided at the optical axis object side of the yawing moving frame 4. Since the meter 61 of the iris unit 62 is provided in this way, the stepping motor 47 for zooming and the shift unit 20 do not interfere with each other.

As described above, a single lens barrel can include the components described in Examples 1 through 5, i.e., the five actuators: the shift unit 20 for compensating image shake, the stepping motor 47 having an encoder, the linear actuator 33, and the iris unit 62 (FIG. 20). Thus, a small-sized lens barrel having high performance can be achieved.

Example 7

Figure 21:
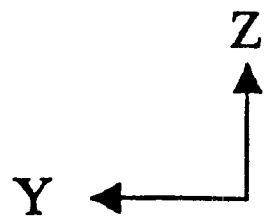
FIG. 21 is a diagram showing the PSD substrate of a lens barrel according to Example 7 of the present invention.
Figure 21:
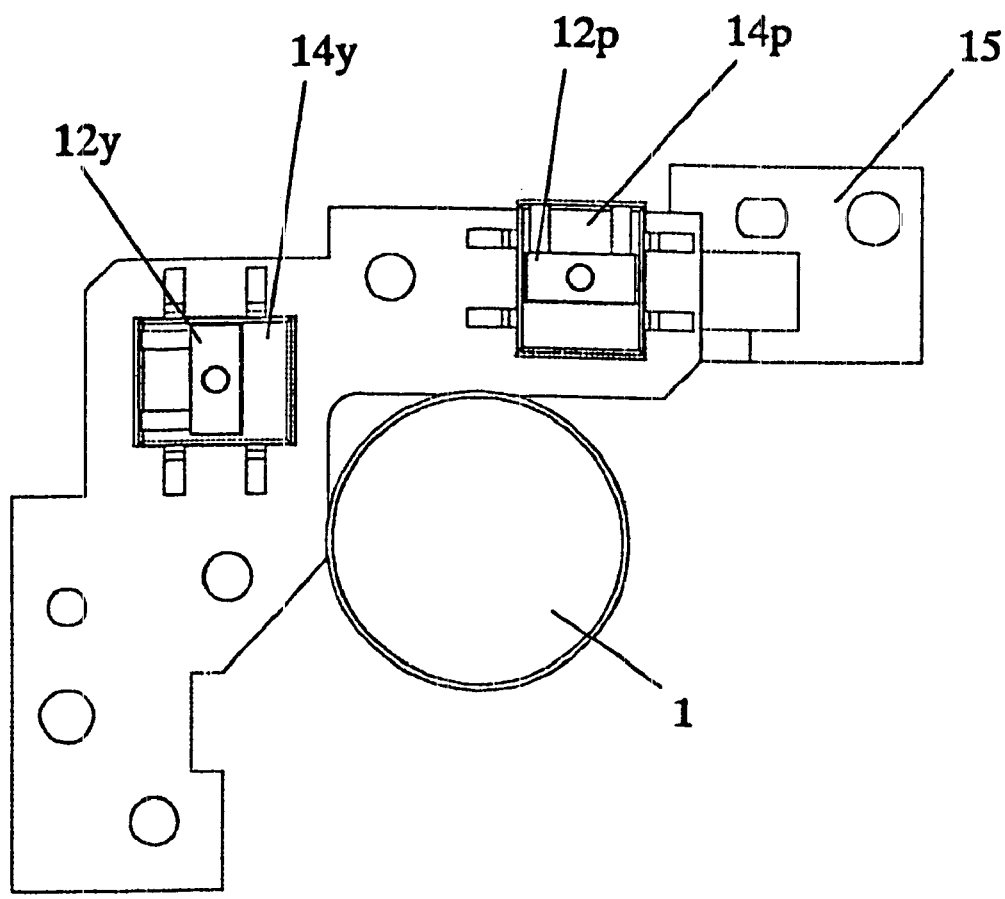
Figure 22:
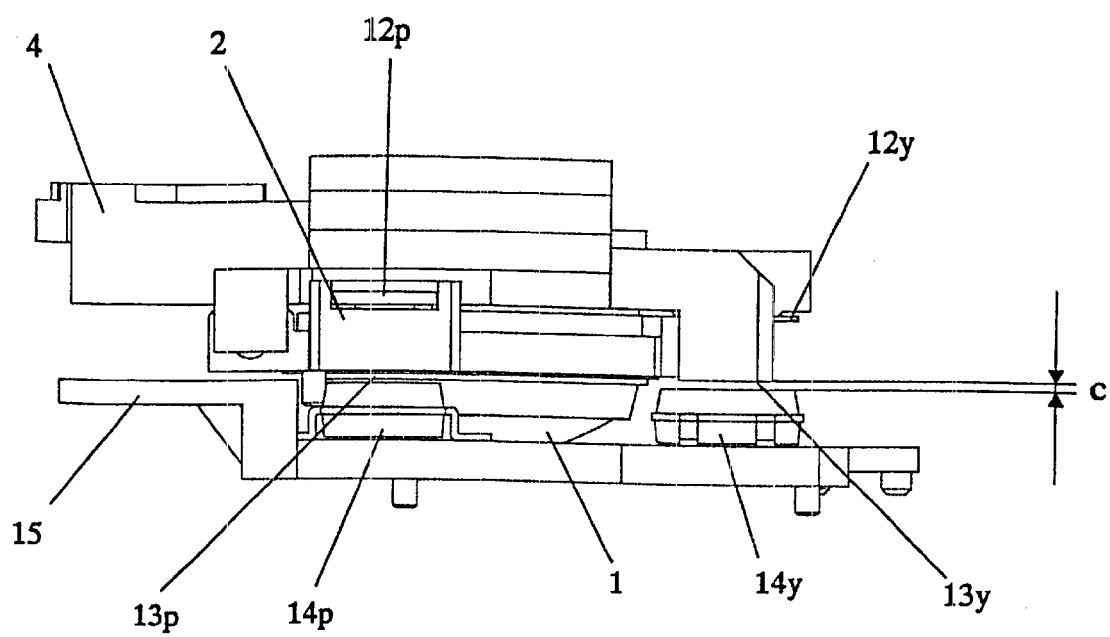
FIG. 22 is a diagram showing the arrangement of an LED and a PSD of the lens barrel according to Example 7 of the present invention.

Next, a seventh embodiment of the present invention will be described with reference to FIGS. 21 through 22. FIG. 21 is a diagram showing the PSD substrate of a lens barrel according to Example 7 of the present invention. FIG. 22 is a diagram showing an arrangement of an LED and a PSD of the lens barrel. The parts described above are indicated by the same reference numerals and their descriptions are omitted.

The shift unit 20 of Example 7 is identical to that described in Example 2. The light emitting elements 12p and 12y and the light receiving elements 14p and 14y for detecting the positions of the pitching and yawing moving frames 2 and 4 of the shift unit 20 need to be fixed to accurate positions in order to improve position detection precision. To this end, as shown in FIG. 21, the light receiving elements 14p and 14y are fixed at predetermined positions on the same PSD substrate 15. Further, in order to effectively use a space in the optical axis direction, the pitching and yawing moving frames 2 and 4 are positioned at different heights. The slits 13p and 13y in which the pitching and yawing light emitting elements 12p and 12y are provided, respectively, are positioned at the same height.

Accordingly, both in the pitching and yawing moving frames 2 and 4, the gaps between the slits 13p and 13y and the light receiving elements 14p and 14y have the same distance c. The amount of light emitted by the light emitting elements 12p and 12y which reach the light receiving sides of the respective light receiving elements 14p and 14y are the same. Therefore, the same position detection precision is achieved by the light receiving elements 14p and 14y.

As described above, in the lens barrel including the shift unit for compensating hand-shake, the pitching and yawing moving frames are positioned at different heights with respect to the optical axis. Therefore, the five actuators can be compactly included in the lens barrel. Further, since the slits of the light emitting elements are positioned at the same height in spite of the different heights of the moving frames, the two light receiving elements can be provided on the same substrate. Therefore, the positions of the light receiving elements can be more precisely determined, thereby improving the position detection precision. Furthermore, the substrate carrying the light receiving elements can be easily fixed to the fixing frame, thereby improving ease of assembly.

Example 8

Figure 23:
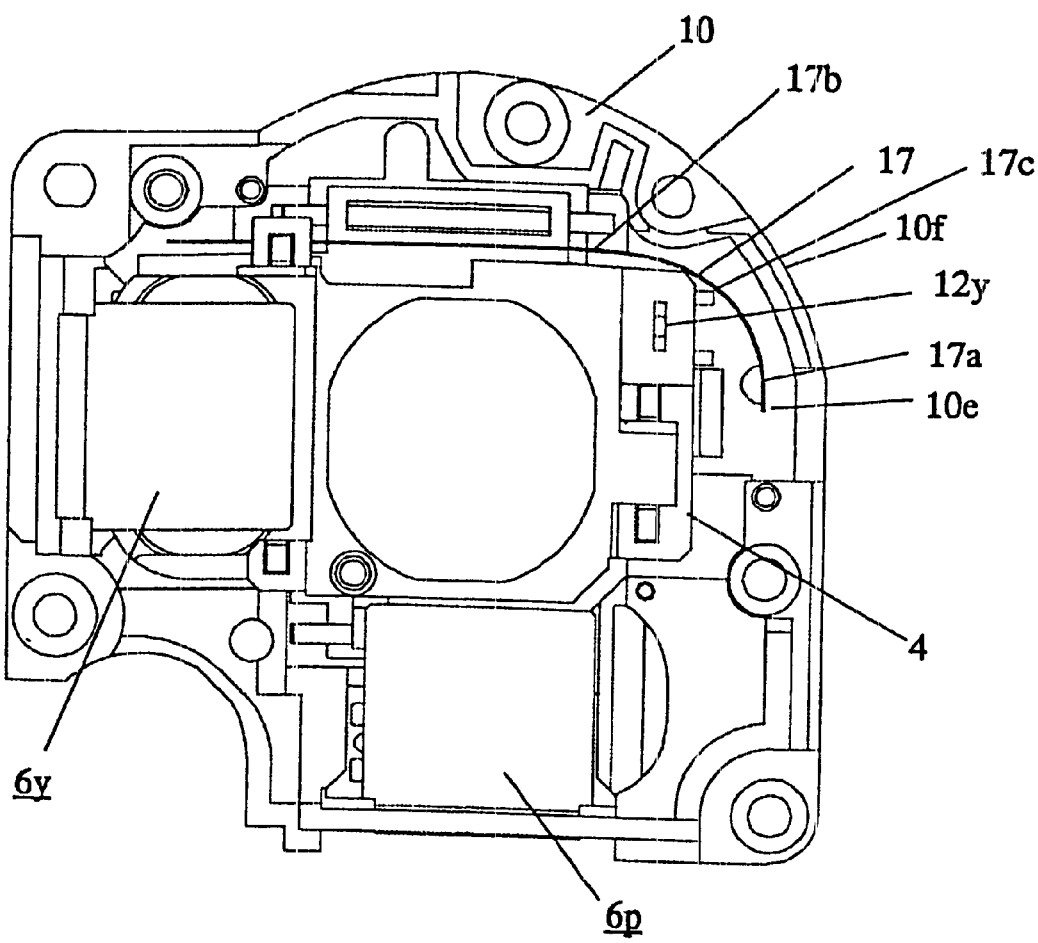
FIG. 23 is a front view of yawing of an image compensation device of a lens barrel according to Example 8 of the present invention.
Figure 24:
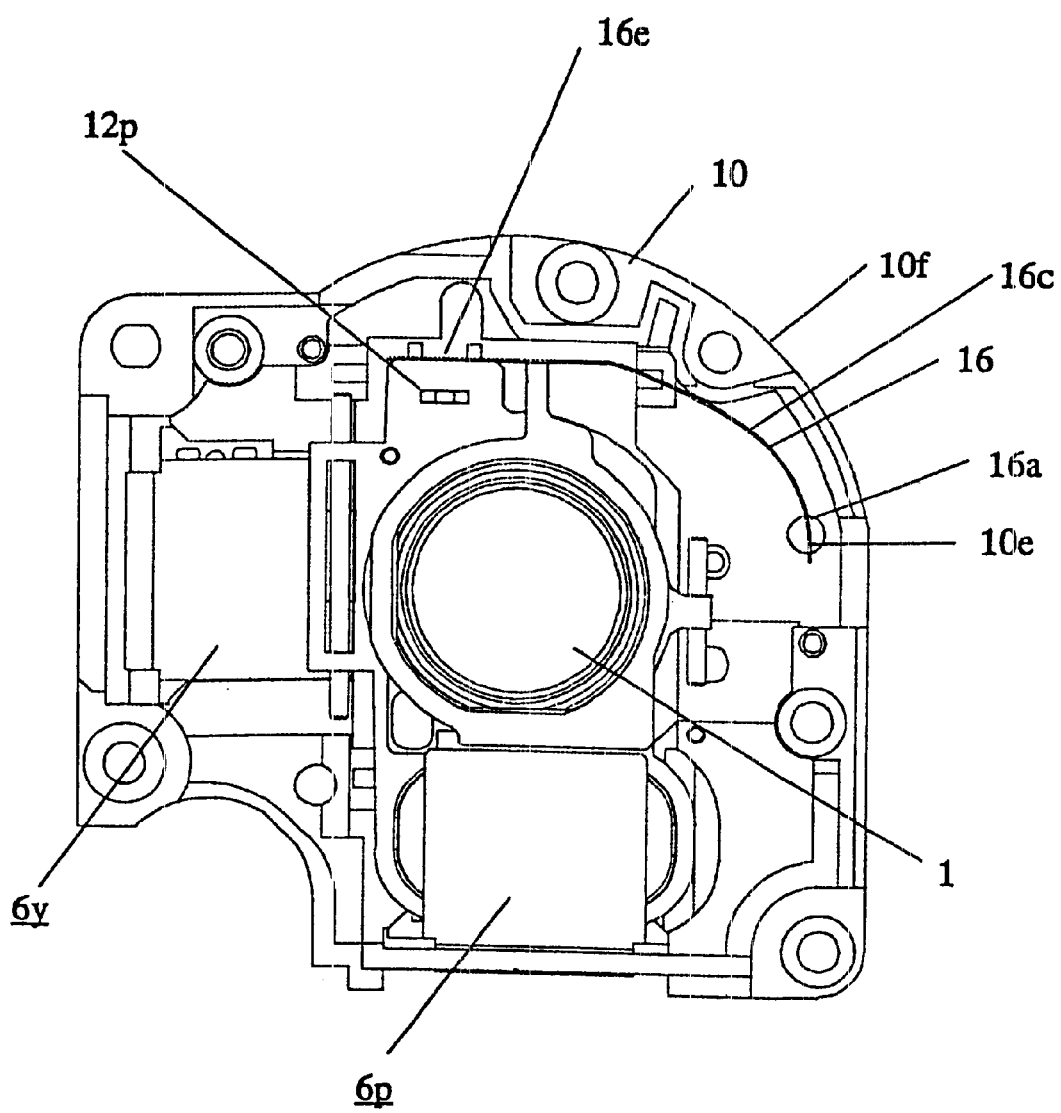
FIG. 24 is a front view of pitching of the image compensation device of the lens barrel according to Example 8 of the present invention.

Next, an eighth embodiment of the present invention will be described with reference to FIGS. 23 through 24. FIG. 23 is a front view of yawing of an image compensation device of a lens barrel according to Example 8 of the present invention. FIG. 24 is a front view of pitching of the image compensation device. The parts described above are indicated by the same reference numerals and their descriptions are omitted.

The shift unit 20 of Example 8 is identical to that described in Example 2. The flexible print cables 16 and 17, respectively, connecting the pitching and yawing moving frames 2 and 4 with the fixing frame 10 will be described.

The one end 16b of the flexible print cable 16 is fixed to the pitching moving frame 2 at the side opposite to the pitching actuator 6p and at the same side as that of the yawing actuator 6y with respect to the center of the optical axis, being substantially perpendicular to the Z direction along which the pitching moving frame 2 is smoothly moved. A first lens moving frame described in the claims corresponds to such a pitching moving frame 2. The one end 17b of the flexible print cable 17 is fixed to the yawing moving frame 4 at the side opposite to the pitching actuator 6p and at the same side as that of the yawing actuator 6y with respect to the center of the optical axis, being substantially parallel to the Y direction along which the yawing moving frame 4 is smoothly moved. A second lens moving frame described in the claims corresponds to such a yawing moving frame 4. The other ends 16a and 17a of the respective flexible print cables 16 and 17 are fixed to the portion 10e of the fixing frame 10, being substantially parallel to the Z direction of the pitching moving frame 2.

The image shake compensation device thus constructed will be described below.

The yawing moving frame 4 is driven in the Y direction in the following way. A current is supplied via the flexible print cable 17 to the coil 7y in response to an instruction from the driving circuit. The flow of the current causes the electromagnetic actuator 6y to generate force in the Y direction which drives the yawing moving frame 4. The pitching moving frame 2 is driven in the Z direction in the following way. A current is supplied via the flexible print cable 16 to the coil 7p in response to an instruction from the driving circuit. The flow of the current causes the electromagnetic actuator 6p to generate force in the Z direction which drives the pitching moving frame 2. In this case, the pitching and yawing flexible print cables 16 and 17 are bent along an R portion 10f provided on the fixing frame 10.

The flexible print cable 16 for pitching is bent at the moving portion 16c between the one end 16b fixed to the pitching moving frame 2 and the other end 16a fixed to the fixing frame 10. Similarly, the flexible print cable 17 for yawing is bent at the moving portion 17c between the one end 17b fixed to the yawing moving frame 4 and the other end 17a fixed to the fixing frame 10. Therefore, both the flexible print cables 16 and 17 can have longer moving portions within such a limited space, so that reaction force is unlikely to be generated in the flexible print cables 16 and 17. This leads to a reduction in load.

As described above, according to Example 8, the moving portions of the flexible print cables of the yawing and pitching moving frames are elongated as much as possible within the limited space. Therefore, an influence of reaction force generated by the bending of the flexible print cables on the yawing and pitching moving frames can be reduced as much as possible. The deterioration of control characteristics can be suppressed. As a result, an image shake compensation device in which the degree of suppression of image shake is increased can be provided.

Although the other ends of the flexible print cables are fixed to the fixing frame, being substantially parallel to the Z direction, another portion of the flexible print cable may be fixed thereto at the fixing position described herein if the flexible print cables are restricted so as to be substantially parallel to the Z direction.

Example 9

Figure 25:
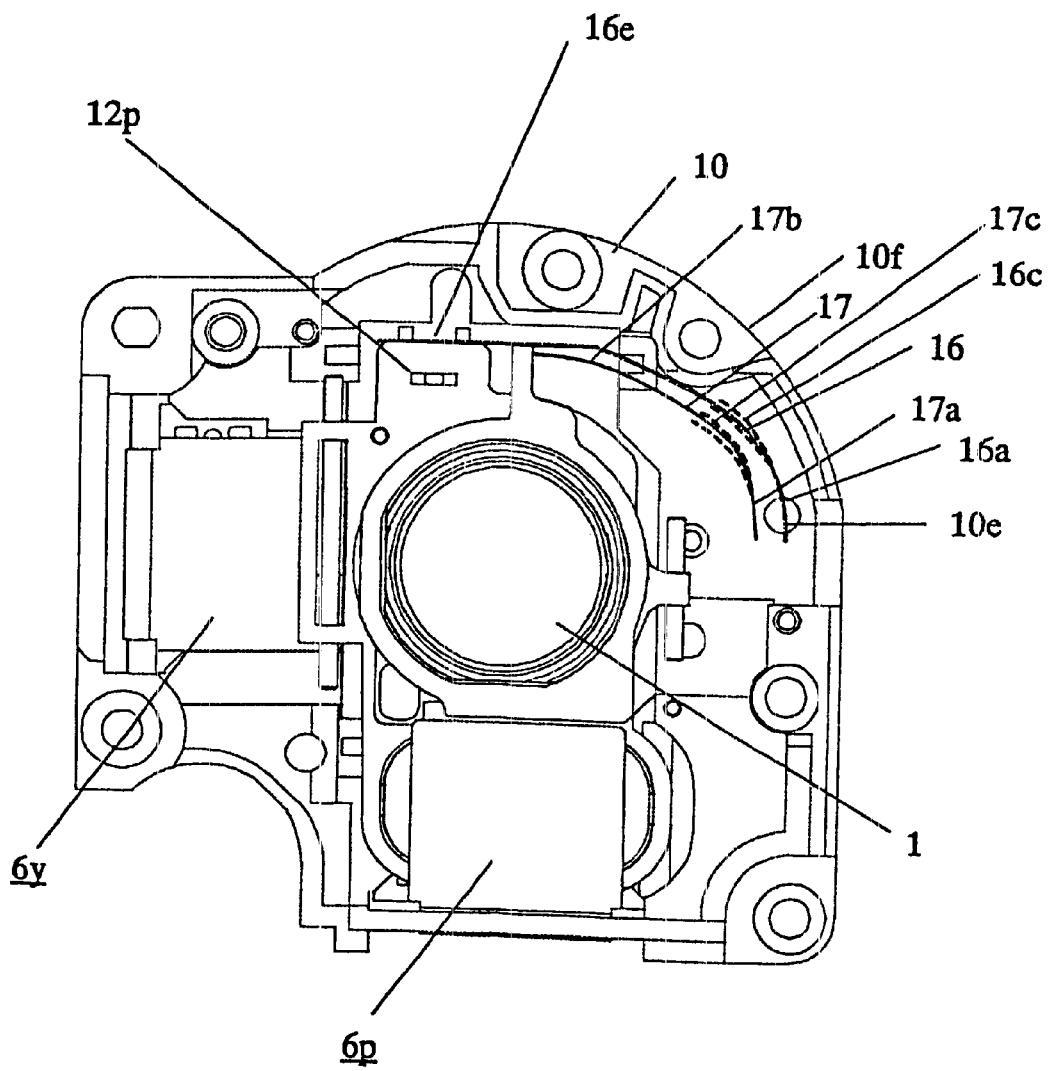
FIG. 25 is a front view of an image compensation device of a lens barrel according to Example 9 of the present invention.

Next, a ninth embodiment of the present invention will be described with reference to FIG. 25. FIG. 25 is a front view of an image compensation device of a lens barrel according to Example 9 of the present invention. Note that in FIG. 25 the yawing moving frame 4 is not shown, but only the flexible print cable 17 is shown. The parts described above are indicated by the same reference numerals and their descriptions are omitted.

The one end 17a of the flexible print cable 17 is fixed to the portion 10e of the fixing frame 10, being substantially parallel to the Z direction. The one end 16a of the flexible print cable 16 is fixed to the pitching moving frame 2 at almost the same position as that of the one end 17a of the flexible print cable 17 of the yawing moving frame 4. being substantially parallel to the Z direction along which the pitching moving frame 2 is smoothly moved. The moving portion 16c of the flexible print cable 17 is provided at the outside of the moving portion 17c of the flexible print cable 17 with respect to the center of the compensation lens group 1.

The operation of the image shake compensation device thus constructed will be described below.

The yawing moving frame 4 is driven in the Y direction in the following way. A current is supplied via the flexible print cable 17 to the coil 7y in response to an instruction from the driving circuit. The flow of the current causes the electromagnetic actuator 6y to generate force in the Y direction which drives the yawing moving frame 4. The pitching moving frame 2 is driven in the Z direction in the following way. A current is supplied via the flexible print cable 16 to the coil 7p in response to an instruction from the driving circuit. The flow of the current causes the electromagnetic actuator 6p to generate force in the Z direction which drives the pitching moving frame 2. In this case, the pitching moving frame 2 is smoothly moved not only in the Z direction, but in the Y direction in association with movement of the yawing moving frame 4. The fixing portion 10a of the flexible print cable 16 to the fixing frame 10 is provided at the outside of the optical axis with respect to the flexible print cable 17 of the yawing moving frame 4.

Therefore, the flexible print cables 16 and 17 are moved as indicated by the dotted lines, so that the flexible print cables 16 and 17 do not contact each other.

As described above, according to Example 9, the one ends 16a and 17a of the respective flexible print cables 16 and 17 of the pitching and yawing moving frames 2 and 4 are fixed at almost the same position 10a of the fixing frame 10. The flexible print cable 16 of the pitching moving frame 2 is provided on the outside with respect to the optical axis. Therefore, the two flexible print cables can be efficiently provided within a small space, thereby obtaining the small-sized image shake compensation device, and the small-sized lens barrel including the image shake compensation device.

Example 10

Next, a tenth embodiment of the present invention will be described with reference to FIGS. 17 and 25. The parts described above are indicated by the same reference numerals and their descriptions are omitted.

The one end 17a of the flexible print cable 17 of the yawing fixing frame 4 is fixed to the fixing frame 10, being substantially parallel to the Z direction along which the pitching moving device 2 is smoothly moved. The one end 16a of the flexible print cable 16 is fixed to the pitching moving frame 2, being substantially parallel to the Z direction along which the pitching moving device 2 is smoothly moved, similar to the flexible print cable 17 of the yawing moving frame 4. The flexible print cable 16 of the pitching moving frame 2 and the flexible print cable 17 of the yawing moving frame 4 are provided at different positions with respect to the optical axis direction. In FIG. 17, the flexible print cable 17 of the yawing moving frame 4 is provided at the optical axis imaging plate side.

The operation of the image shake compensation device thus constructed will be described below.

The yawing moving frame 4 is driven in the Y direction in the following way. A current is supplied via the flexible print cable 17 to the coil 7y in response to an instruction from the driving circuit. The flow of the current causes the electromagnetic actuator 6y to generate force in the Y direction which drives the yawing moving frame 4. The pitching moving frame 2 is driven in the Z direction in the following way. A current is supplied via the flexible print cable 16 to the coil 7p in response to an instruction from the driving circuit. The flow of the current causes the electromagnetic actuator 6p to generate force in the Z direction which drives the pitching moving frame 2. In this case, the moving portion 17c of the flexible print cable 17 of the yawing moving frame 4 is bent in the Y direction, and the moving portion 16c of the flexible print cable 16 of the pitching moving frame 2 is bent in the Z and Y directions. Nevertheless, since the flexible print cables 16 and 17 are positioned at different heights with respect to the optical axis direction, the flexible print cables 16 and 17 do not contact each other.

As described above, according to Example 10, the flexible print cables 16 and 17 of the respective pitching and yawing moving frames 2 and 4 are positioned at different heights with respect to the optical axis direction, so that the two flexible print cables can be efficiently provided even within an insufficient space in the plane perpendicular to the optical axis, thereby obtaining the small-sized image shake compensation device, and the small-sized lens barrel including the image shake compensation device.

Example 11

Next, an eleventh embodiment of the present invention will be described with reference to FIG. 25. The parts described above are indicated by the same reference numerals and their descriptions are omitted. The one end 17a of the flexible print cable 17 of the yawing fixing frame 4 is fixed to the portion 10e of the fixing frame 10, being substantially parallel to the Z direction along which the pitching moving device 2 is smoothly moved. The moving portion 17c of the flexible print cable 17 is substantially in the shape of a circular arc. The one end 16a of the flexible print cable 16 is fixed to the pitching moving frame 2 at almost the same position as the one end 17a of the flexible print cable 17 of the yawing fixing frame 4, being substantially parallel to the Z direction along which the pitching moving device 2 is smoothly moved. The moving portion 16c is substantially in the shape of a circular arc. The portion 10f of the fixing frame 10 opposing to the moving portions 16c and 17c of the respective flexible print cables 16 and 17 are substantially in the shape of a circular arc.

The operation of the image shake compensation device thus constructed will be described below.

The yawing moving. frame 4 is driven in the Y direction in the following way. A current is supplied via the flexible print cable 17 to the coil 7y in response to an instruction from the driving circuit. The flow of the current causes the electromagnetic actuator 6y to generate force in the Y direction which drives the yawing moving frame 4. The pitching moving frame 2 is driven in the Z direction in the following way. A current is supplied via the flexible print cable 16 to the coil 7p in response to an instruction from the driving circuit. The flow of the current causes the electromagnetic actuator 6p to generate force in the Z direction which drives the pitching moving frame 2. In this case, the moving portion 16c of the flexible print cable 16 of the pitching moving frame 2 is positioned at the outside with respect to the moving portion 17c of the flexible print cable 17 of the yawing moving frame 4, and is bent in the Z and Y directions. Nevertheless, since the moving portion 16c and the corresponding portion 10f of the fixing frame 10 are in the shape of a circular arc, even if the flexible. print cable 16 contacts the fixing frame 10, the flexible print cable 16 does not take a large load from the fixing frame 10. Therefore, it is possible to minimize the deterioration of control characteristics due to the load.

As described above, according to Example 11, the moving portions 16c and 17c of the respective flexible print cables 16 and 17 and the moving portion 16a and the corresponding portion 10f of the fixing frame 10 are in the shape of a circular arc. Therefore, the shape has no protrusion. In this case, the pitching and yawing moving frames 2 and 4 are positioned at different heights with respect to the optical axis direction, so that the two flexible print cables can be efficiently provided even within an insufficient space in the plane perpendicular to the optical axis, thereby obtaining the small-sized image shake compensation device. Further, components can be incorporated into an optical apparatus at high density, so that a small-sized optical apparatus carrying the lens barrel including the image shake compensation device can be obtained.

INDUSTRIAL APPLICABILITY

As described above, in the lens barrel of the present invention, an adverse influence of the magnetic flux leakage generated by the actuators can be eliminated.

What is claimed is:

1. A lens barrel including:

a first lens group;

a second lens group;

a third lens group;

a first actuator for driving the first lens group;

a second actuator for driving the second lens group; and third and fourth actuators for driving the third lens group, wherein at least one of the first through fourth actuators is provided at a position such that magnetic flux leakage from at least one of the first through fourth actuators is canceled.

2. A lens barrel according to claim 1, wherein the first actuator includes:

a stepping motor;

a first magnet in the shape of a barrel or column, magnetized to have multiple poles in a circular direction, and attached coaxially to the stepping motor in such a manner as to rotate; and a first magnetic sensor provided opposing an outer edge of the first magnet, wherein the second actuator includes:

a second magnet magnetized perpendicular to a driving direction;

a yoke;

a coil provided at a predetermined gap from the second magnet, capable of freely moving in the driving direction when a current is supplied thereto in such a manner as to flow in a direction perpendicular to magnetic flux generated by the second magnet; and a second magnetic sensor, and wherein the first magnetic sensor is provided at a position such that magnetic flux leakage from a magnetic circuit including the second magnet and the yoke is canceled.

3. A lens barrel according to claim 1, wherein the second actuator includes:

a magnet magnetized perpendicular to a driving direction;

a yoke;

a coil provided at a predetermined gap from the magnet, capable of freely moving in the driving direction when a current is supplied thereto in such a manner as to flow in a direction perpendicular to flux generated by the magnet: and a magnetic sensor, wherein the magnetic sensor is provided at a position such that magnetic flux leakage from at least one of the third and fourth actuators is canceled.

4. A lens barrel according to claim 1, wherein the third actuator includes a third magnet;

the fourth actuator includes a fourth magnet; and the third magnet and the fourth magnet are provided in such a manner that the magnetization of the third and fourth magnets is reversed when viewed in the center of an optical axis.

5. A lens barrel according to claim 4, wherein the first actuator includes:

a stepping motor;

a first magnet in the shape of a barrel or column, magnetized to have multiple poles in a circular direction, and attached coaxially to the stepping motor in such a manner as to rotate; and a magnetic sensor provided opposing an outer edge of the first magnet;

wherein the third and fourth magnets are provided at positions such that magnetic flux leakage to the magnetic sensor is canceled.

6. A lens barrel according to claim 1 further including first and second lens moving frames holding the third lens group and capable of being smoothly moved in first and second directions perpendicular to an optical axis, respectively, wherein one of the third or fourth actuators provided at an optical axis imaging plane side is provided overlapping the lens moving frame provided at an optical axis object side when viewed in the optical axis direction.

7. A lens barrel according to claim 1, wherein the second actuator is provided at an optical axis imaging plane side of one of the third and fourth actuators provided at an optical axis object side, overlapping the one of the third and fourth actuators, when viewed in the optical axis direction.

8. A lens barrel according to claim 1 further including first and second lens moving frames holding the third lens group and capable of being smoothly moved in first and second directions perpendicular to the optical axis, respectively; and a fixing frame holding the first and second lens moving frames, leaving the first and second lens moving frames capable of being smoothly moved, wherein the fixing frame includes a depression in a portion surrounded by the third and fourth actuators; and the first actuator is provided in the depression.

9. A lens barrel according to claim 1 further including an actuator for driving an iris, wherein the actuator for driving the iris is provided at the optical axis object side of one of the third and fourth actuators provided at an optical axis imaging plane side.

10. A lens barrel according to claim 1 further including:

first and second lens moving frames holding the third lens group, provided at different heights with respect to an optical axis, and capable of being smoothly moved in first and second directions perpendicular to the optical axis;

a first light emitting portion incorporated into the first lens moving frame for detecting a position of the first lens moving frame; and a second light emitting portion incorporated into the second lens moving frame for detecting a position of the second lens moving frame, wherein the first and second light emitting portions are provided at substantially the same height when viewed in the optical axis direction.

11. A lens barrel according to claim 1 further including:

first and second lens moving frames holding the third lends group, and capable of being smoothly moved in first and second directions perpendicular to an optical axis; and a fixing frame fixing the first and second lens moving frames, leaving the first and second lens moving frames capable of being smoothly moved, wherein the third actuator drives the first lens moving frame;

the fourth actuator drives the second lens moving frame;

the lens barrel further includes: a first flexible print cable electrically connected to the third actuator; and a second flexible print cable electrically connected to the fourth actuator;

wherein one end of the first flexible print cable is fixed to the first lens moving frame at a side thereof opposite to the third actuator with respect to the optical axis and at the same side as that of the fourth actuator;

one end of the second flexible print cable is fixed to the second lens moving frame at a side thereof opposite to the third and fourth actuators with respect to the optical axis; and other ends of the first and second flexible print cables are fixed to the fixing frame at a side thereof opposite to the fourth actuator with respect to the optical axis, being substantially parallel to a direction along with the first lens moving frame is smoothly moved.

12. A lens barrel according to claim 11, wherein the first flexible print cable is provided at an outside from the center of the optical axis with respect to the second flexible print cable.

13. A lens barrel according to claim 11, wherein the first and second flexible print cables are provided at different heights with respect of the optical axis of the third lens group.

14. A lens barrel according to claim 11, wherein moving portions of the first and second flexible print cables and an outline of the fixing frame corresponding to the moving portions of the first and second flexible print cables are substantially in the shape of a circular arc; and the moving portions of the first and second flexible print cables can move along the fixing frame.

15. A lens barrel including:

a first lens group;

a second lens group;

a third lends group;

a first actuator for driving the first lens group;

a second actuator for driving the second lens group;

third and fourth actuators for driving the third lens group;

first and second lens moving frames holding the third lens group and capable of being smoothly moved in first and second directions perpendicular to an optical axis; and a fixing frame fixing the first and second lens moving frames, leaving the first and second lens moving frames capable of being smoothly moved, wherein the third actuator drives the first lens moving frame, the fourth actuator drives the second lens moving frame, the lens barrel further includes: a first flexible print cable electrically connected to the third actuator; and a second flexible print cable electrically connected to the fourth actuator;

wherein one end of the first flexible print cable is fixed to the first lens moving frame at a side thereof opposite to the third actuator with respect to the optical axis and at the same side as that of the fourth actuator, one end of the second flexible print cable is fixed to the second lens moving frame at a side thereof opposite to the third and fourth actuators with respect to the optical axis, and other ends of the first and second flexible print cables are fixed to the fixing frame at a side thereof opposite to the fourth actuator with respect to the optical axis, being substantially parallel to a direction along which the first lens moving frame is smoothly moved.

16. A lens barrel according to claim 15, wherein the first flexible print cable is provided at an outside from the center of the optical axis with respect to the second flexible print cable.

17. A lens barrel according to claim 15, wherein the first and second flexible print cables are provided at different heights with respect to the optical axis of the third lens group.

18. A lens barrel according to claim 15, wherein moving portions of the first and second flexible print cables and an outline of the fixing frame corresponding to the moving portions of the first and second flexible print cables are substantially in the shape of a circular arc; and the moving portions of the first and second flexible print cables can move along the fixing frame.

* * * * *